US012628008B2

(12) United States Patent (10) Patent No.: US 12,628,008 B2
Ida et al. (45) Date of Patent: May 12, 2026

(54) RADIO COMMUNICATION DEVICE AND METHOD

(71) Applicant: Renesas Electronics Corporation, Tokyo (JP)

(72) Inventors: Kazutaka Ida, Tokyo (JP); Koji Kubota, Tokyo (JP); Fumio Urabe, Tokyo (JP); Kenji Ogami, Tokyo (JP); Hiroki Sugimoto, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 306 days.

(21) Appl. No.: 18/516,812

(22) Filed: Nov. 21, 2023

(65) Prior Publication Data

US 2024/0172009 A1 May 23, 2024

(30) Foreign Application Priority Data

Nov. 21, 2022 (JP) ................................. 2022-185478

(51) Int. Cl.
| | |
|---|---|
| *H04W 24/04* | (2009.01) |
| *H04W 76/10* | (2018.01) |
| *H04W 76/34* | (2018.01) |
| *H04W 76/38* | (2018.01) |
| *H04W 84/18* | (2009.01) |

(52) U.S. Cl.
CPC .......... *H04W 24/04* (2013.01); *H04W 76/10* (2018.02); *H04W 76/34* (2018.02); *H04W 76/38* (2018.02); *H04W 84/18* (2013.01)

(58) Field of Classification Search
None
See application file for complete search history.

(56) References Cited

U.S. PATENT DOCUMENTS

| | | | |
|---|---|---|---|
| 11,272,348 B2 | 3/2022 | Higuchi | |
| 2011/0271275 A1* | 11/2011 | Ochi ......................... | G06F 8/63 |
| | | | 717/177 |
| 2015/0341820 A1* | 11/2015 | Kikuzuki ............ | H04W 74/006 |
| | | | 455/41.2 |

FOREIGN PATENT DOCUMENTS

JP          2020-195062 A     12/2020

OTHER PUBLICATIONS

Notice of Reasons for Refusal received in corresponding Japanese Patent Application No. 2022-185478, mailed Feb. 24, 2026.
S132 SoftDevice, SoftDevice Specification v7.1, Nordic Semiconductor, 2019, pp. 153442-5170, obtained Feb. 3, 2026, <http://docsbe.nordicsemi.com/bundle/sds_s132_SDS_v7.1.pdf?_LANG=enus>.

* cited by examiner

*Primary Examiner* — Hong S Cho
(74) *Attorney, Agent, or Firm* — Rimon P.C.

(57) ABSTRACT

A specific unit in a first wireless communication device determines whether a second wireless communication device is a priority candidate device based on the possibility that the connection with the second wireless communication device will be disconnected. When a communication control unit receives a permission request for a communication with the second wireless communication device from a connection control unit, it grants a permission to a communication with a "priority candidate device".

20 Claims, 20 Drawing Sheets

Figure 3:
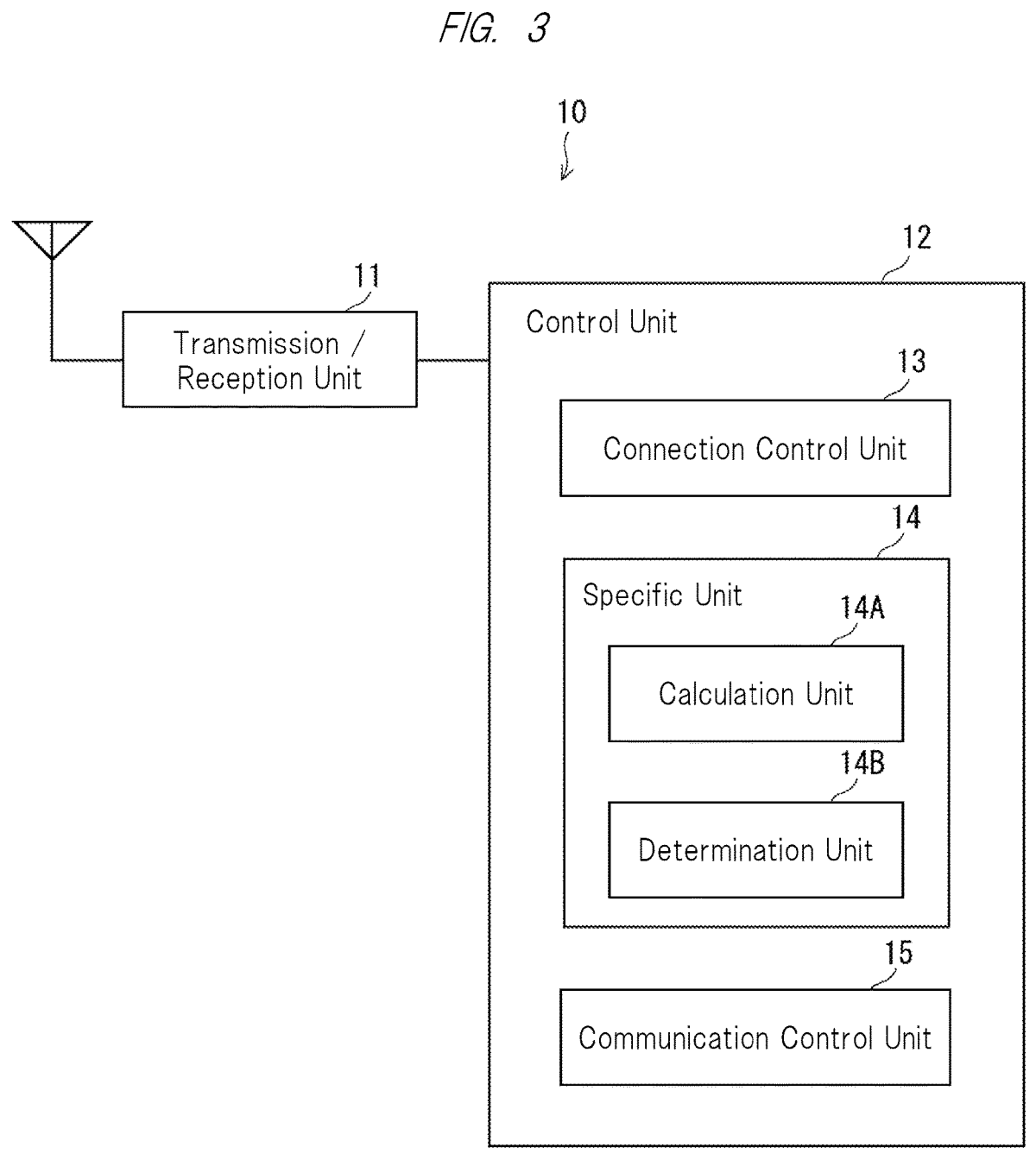

Transmission /
Reception Unit

12

Control Unit

13

Connection Control Unit

14

Specific Unit

14A

Calculation Unit

14B

Determination Unit

15

Communication Control Unit

Relevant
Connection

Connection1

$C_1 \rightarrow P$   $P \rightarrow C_1$   $T_2$ t[sec]

T

Priority
Connection $C_2 \rightarrow P$   $P \rightarrow C_2$

Connection2 t[sec]

Communication
$T_1$  Non-permission

Relevant
Connection

Connection1

$C_1 \rightarrow P$ t[sec]

T

Priority
Connection $C_2 \rightarrow P$   $P \rightarrow C_2$

Connection2 t[sec]

$T_2$

Priority

*FIG. 8*

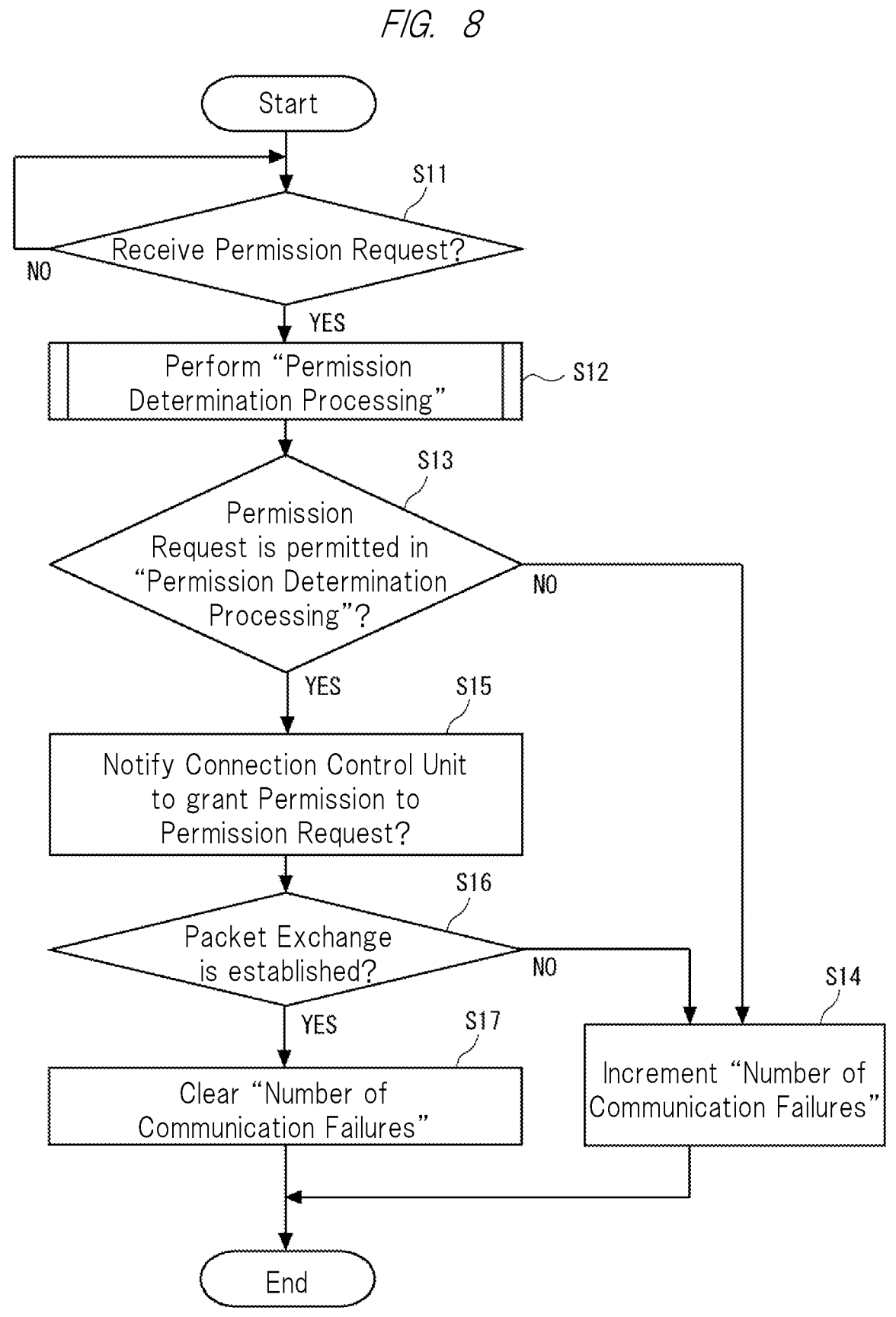

```
                    ┌─────────┐
                    │  Start  │
                    └────┬────┘
                         │
          ┌──────────────┤
          │              ▼              S11
          │     ╱─────────────────────╲
      NO  │    ╱  Receive Permission   ╲
          └───◀    Request?             │
               ╲                       ╱
                ╲─────────────────────╱
                         │ YES
                         ▼
              ┌──╥───────────────────╥──┐
              │  ║  Perform "Permission ║  │   S12
              │  ║  Determination       ║  │
              │  ║  Processing"         ║  │
              └──╨───────┬───────────╨──┘
                         │               S13
                         ▼
                ╱──────────────────╲
               ╱   Permission       ╲
              ╱  Request is permitted ╲
             ◀  in "Permission         │   NO ──────┐
              ╲ Determination          ╱            │
               ╲ Processing"?         ╱             │
                ╲──────────────────╱               │
                         │ YES      S15             │
                         ▼                          │
              ┌─────────────────────────┐          │
              │  Notify Connection       │          │
              │  Control Unit to grant   │          │
              │  Permission to           │          │
              │  Permission Request?     │          │
              └───────────┬─────────────┘          │
                          │             S16         │
                          ▼                         │
                 ╱─────────────────╲                │
                ╱  Packet Exchange   ╲   NO ─────┐  │
               ◀   is established?    │          │  │
                ╲                    ╱           │  │
                 ╲─────────────────╱            │  │
                          │ YES    S17          ▼  ▼       S14
                          ▼              ┌─────────────────────┐
              ┌─────────────────────┐    │  Increment "Number   │
              │  Clear "Number of    │    │  of Communication    │
              │  Communication       │    │  Failures"           │
              │  Failures"           │    └──────────┬──────────┘
              └───────────┬─────────┘               │
                          │◀──────────────────────────┘
                          ▼
                    ┌─────────┐
                    │   End   │
                    └─────────┘
```

*FIG. 9*

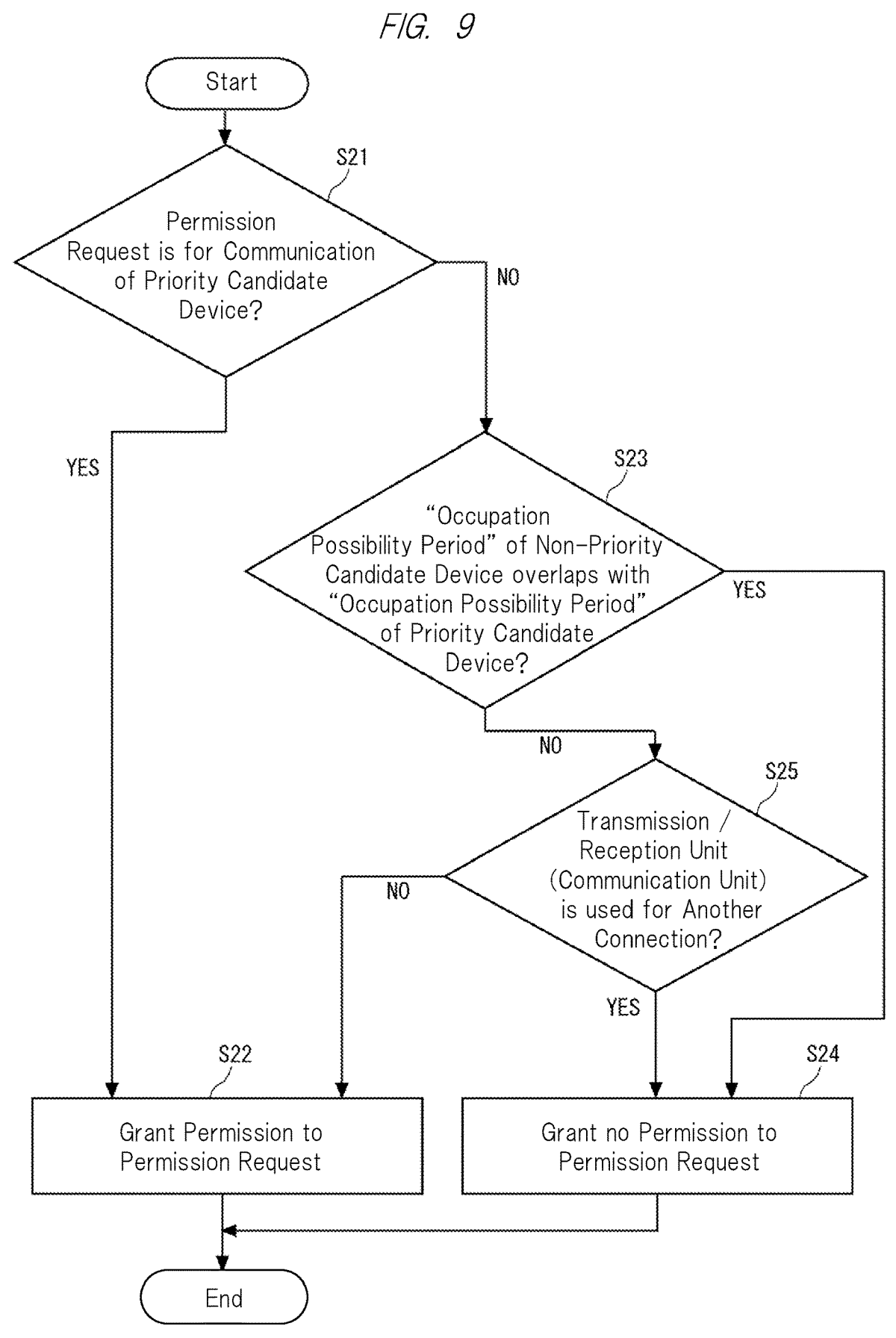

```
              ┌──────────┐
              │  Start   │
              └────┬─────┘
                   │
                   ▼
              ╱──────────╲                     S21
            ╱   Permission ╲
          ╱ Request is for   ╲
         ╱  Communication      ╲──── NO ───┐
         ╲  of Priority        ╱            │
          ╲  Candidate       ╱              │
            ╲  Device?     ╱                │
              ╲──────────╱                  │
                   │                        ▼
                 YES                  ╱──────────╲              S23
                   │                ╱ "Occupation  ╲
                   │              ╱ Possibility Period"╲
                   │            ╱ of Non-Priority      ╲─── YES ───┐
                   │            ╲ Candidate Device      ╱          │
                   │             ╲overlaps with        ╱           │
                   │              ╲"Occupation        ╱            │
                   │               ╲Possibility Period"╱           │
                   │                ╲of Priority     ╱             │
                   │                 ╲Candidate    ╱               │
                   │                  ╲ Device?  ╱                 │
                   │                    ╲──────╱                   │
                   │                      │                        │
                   │                     NO                        │
                   │                      ▼                        │
                   │               ╱──────────╲          S25       │
                   │             ╱ Transmission /╲                 │
                   │           ╱  Reception Unit   ╲                │
                   │   ┌─ NO ─╱ (Communication Unit)╲              │
                   │   │      ╲ is used for Another  ╱              │
                   │   │       ╲  Connection?      ╱                │
                   │   │        ╲──────────────╱                   │
                   │   │              │                            │
                   │   │             YES                           │
                   │   │              │                            │
                   ▼   ▼              ▼                            ▼
              S22 ┌────────────┐    ┌──────────────────────┐ S24
                  │Grant       │    │Grant no Permission to │
                  │Permission  │    │Permission Request     │
                  │to Permission│   └──────────┬───────────┘
                  │Request     │               │
                  └─────┬──────┘               │
                        │◄────────────────────┘
                        ▼
                  ┌──────────┐
                  │   End    │
                  └──────────┘
```

*FIG. 10*

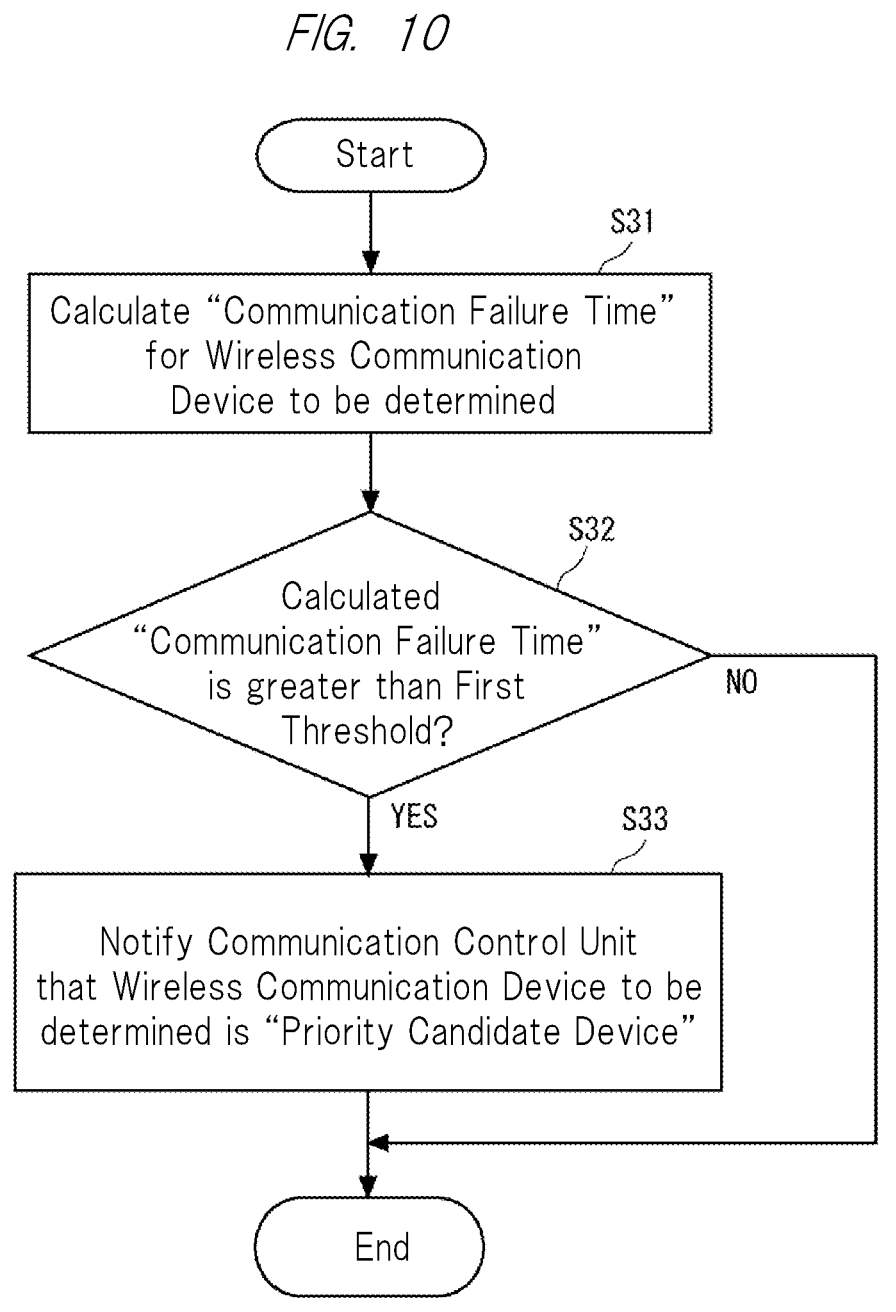

```
                    ┌─────────────┐
                    │    Start    │
                    └──────┬──────┘
                           │                    S31
                           ▼
        ┌──────────────────────────────────────────┐
        │  Calculate "Communication Failure Time"   │
        │        for Wireless Communication         │
        │          Device to be determined          │
        └──────────────────────┬───────────────────┘
                               │              S32
                               ▼
                    Calculated
              "Communication Failure Time"              NO
                 is greater than First
                      Threshold?
                               │
                              YES              S33
                               ▼
        ┌──────────────────────────────────────────┐
        │      Notify Communication Control Unit    │
        │  that Wireless Communication Device to be │
        │  determined is "Priority Candidate Device"│
        └──────────────────────┬───────────────────┘
                               │
                               ▼
                    ┌─────────────┐
                    │     End     │
                    └─────────────┘
```

RADIO COMMUNICATION DEVICE AND METHOD

CROSS-REFERENCE TO RELATED APPLICATIONS

The present application claims priority from Japanese Patent Application No. 2022-185478 filed on Nov. 21, 2022, the content of which is hereby incorporated by reference to this application.

BACKGROUND

The present disclosure relates to radio communication device and a method.

As a technique for short-range communication, there is a BLE (Bluetooth (registered trademark) Low Energy) technique, which is a type of digital wireless communication standard (for example, Patent Document 1). When a first communication device and a second communication device communicate with each other in the BLE technique, a side that begins and leads a connection is called a "central (device)", and a side that accepts the connection is called a "peripheral (device)".

SUMMARY

A communication between the central and the peripheral is performed during a plurality of "Connection Interval" periods coming repetitively. Reference timing (start timing) of the connection interval period is called an "anchor point". A parameter such as a connection interval are included in a CONNECT_IND packet sent by the central in response to an advertising packet sent by the peripheral.

The inventor (s) has found that when the two centrals attempt to communicate with the one peripheral, the communication of one of the centrals may be repetitively made and the communication of the other of the centrals may not be made. That is, it is assumed that a communication unit of the peripheral can only transmit and receive to and from one of the centrals at the same time. Then, when the communication period of one of the centrals and the communication period of the other of the centrals overlap, the communication of one of the centrals whose communication comes first may be repetitively made and the timing communication of the other of the centrals may not be made. In addition, the connection between the other of the centrals, for which communication is not made for a predetermined period of time, and the one peripheral is cut off, so that stability of the communication may be impaired.

Incidentally, for example, even if the communication period of one of the centrals and the communication period of the other of the centrals do not overlap in an initial stage, the communication period of one of the centrals and the communication period of the other of the centrals may overlap in a later stage due to a frequency deviation between a frequency of a crystal oscillator of one of the centrals and a frequency of a crystal oscillator of the other of the centrals.

Other problems and novel features will be apparent from the description of the present specification and the accompanied drawings.

According to one embodiment, a first wireless communication device specifies, as a priority candidate device, a wireless communication device having a high possibility that a communication will be disconnected, and when receiving a permission request for each o a communication with a second wireless communication device and a communication with a third wireless communication device, first wireless communication device grants a permission to the communication with the priority candidate device out of the second wireless communication device and the third wireless communication device.

By the present disclosure, the stability of the communication can be improved.

BRIEF DESCRIPTION OF THE DRAWINGS

FIG. 3 is a block diagram showing one example of a first wireless communication device in the first embodiment.

FIG. 8 is a flow chart showing one example of a processing operation of a communication control unit in the first wireless communication device of the first embodiment.

FIG. 9 is a flowchart showing one example of a permission determination processing.

FIG. 10 is a flow chart showing one example of a processing operation of a specific unit in the first wireless communication device of the first embodiment.

FIG. 14 is a diagram for explaining a processing operation of a communication control unit in a modification example <2> of the second embodiment.

FIG. 15 is a block diagram showing one example of a first wireless communication device in a third embodiment.

FIG. 17 is a flow chart showing one example of a processing operation of a specific unit in the first wireless communication device of the third embodiment.

FIG. 18 is a diagram for explaining one example of a processing operation of the first wireless communication device of the third embodiment.

DETAILED DESCRIPTION

Figure 1A:
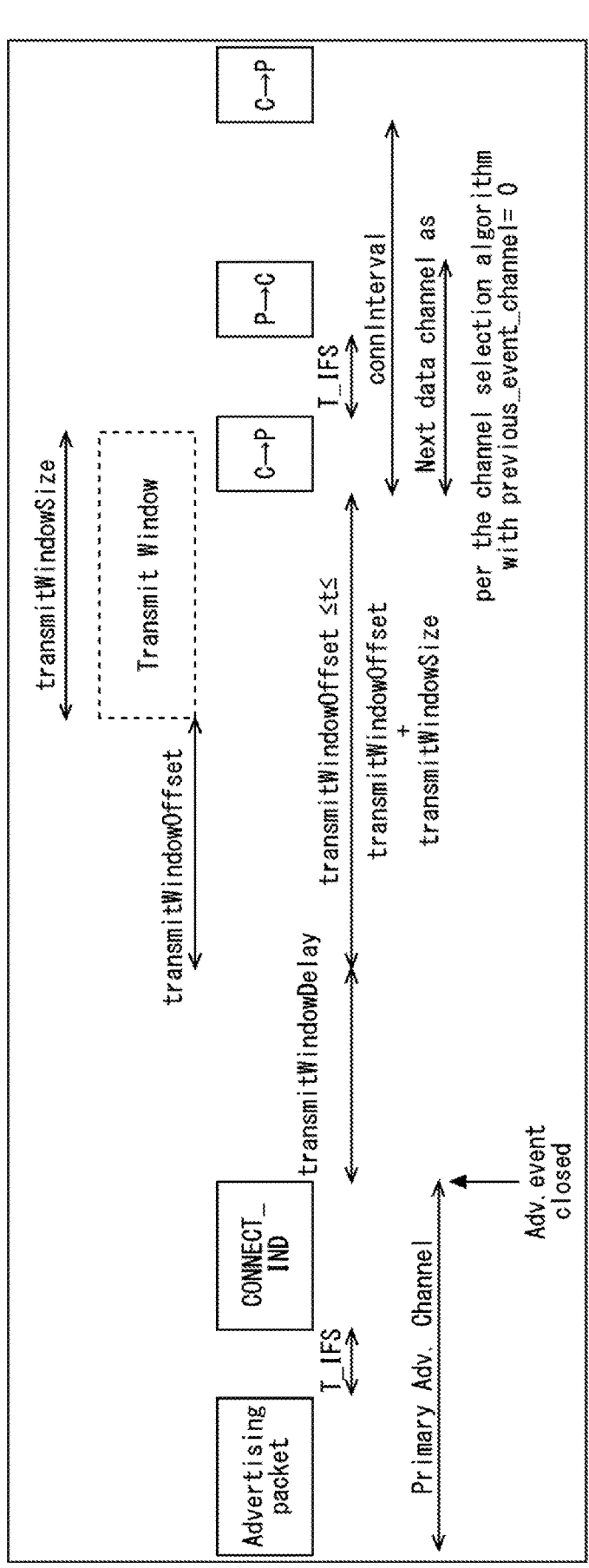
FIG. 1A is a diagram for explaining a related technique.

Hereinafter, embodiments will be described with reference to the drawings. Incidentally, in the embodiments, the same or equivalent elements are denoted by the same reference numerals, and an overlapping description thereof will be omitted.

Two or more embodiments described below can be implemented independently or appropriately in combination. These two or more embodiments have novel features that are different from one another. Therefore, these two or more embodiments contribute to solving mutually different objects or problems, and contribute to achieving mutually different effects.

(Related Technique)

First, a related technique will be described. Individual embodiments are based on these techniques. In other words, these techniques may be incorporated into the individual embodiments.

FIG. 1A is a diagram for explaining a related technique. Establishment and maintenance of a connection of BLE (Bluetooth Low Energy) will be described with reference to FIG. 1A.

As described above, when a first communication device and a second communication device communicate with each other in a BLE technique, a side that begins and leads the connection is called a "central (device)", and a side that accepts the connection is called a "peripheral (device)".

The central makes a "connection request" by transmitting a CONNECT_IND packet to the peripheral in response to an advertising packet transmitted from the peripheral. The CONNECT_IND packet is sent from the central after time T_IFS (150 us) from timing when the central receives the advertising packet.

Then, the central transmits first packet during t represented by the following equation (1).

$$\begin{array}{r}\text{transmitWindowDelay+transmitWindowOffset} \leq t\text{-} \\ \leq \text{transmitWindowDelay+transmitWindowOff-} \\ \text{set+transmitWindowsSize} \qquad (1)\end{array}$$

That is, the central shifts start timing of transmitting window (Transmit Window) by the "transmitWindowDelay" and the "transmitWindowOffset", and transmits the first packet within the transmitting window. The transmitting window has a size (length of time) corresponding to the transmitWindowsSize.

When the peripheral receives a packet from the central, it transmits the packet to the central after time T_IFS from reception timing. In the following, that the central and the peripheral respectively transmit once the packet to each other is sometime simply referred to as "packet switching". Also, a period during which the "packet exchange" is performed may be called an "exchange unit period".

Normally, the central and the peripheral repeat this packet exchange each time a connection interval (conn Interval) elapses. For this reason, the packet exchange at each connection interval is sometimes called a connection event. Timing (point in time) at which the connection interval starts and the packet transmitting of the central is started is called an "anchor point". That is, the anchor point appears repeatedly at each connection interval.

Figure 1B:
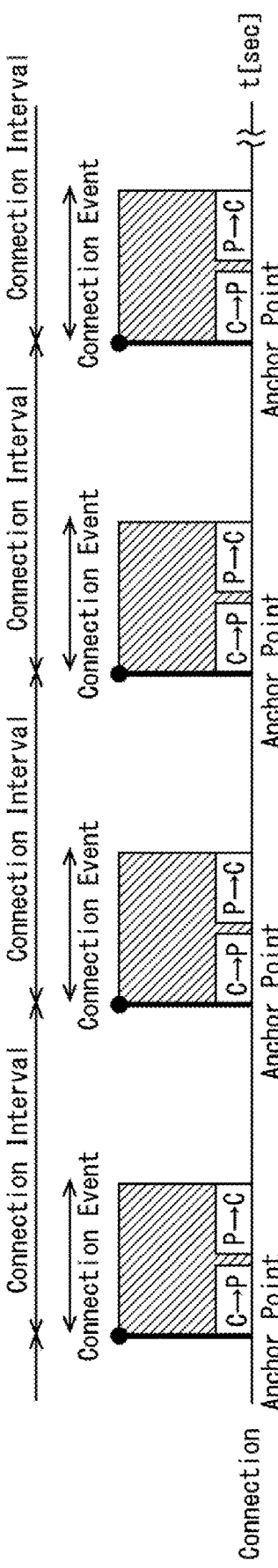
FIG. 1B is a diagram showing a connection between a central and a peripheral.

FIG. 1B is a diagram explaining a connection between the central and the peripheral. "Packet C→P" in FIG. 1B is a packet that the central transmits to the peripheral. If a rectangular frame indicating the "packet C→P" is represented by a solid line, it means that the peripheral has received this packet. If a rectangular frame indicating the "packet C→P" is represented by a dotted line, it means that the central has transmitted this packet, but the peripheral does not receive it. Also, "packet P→C" in FIG. 1B is a packet that the peripheral transmits to the central. If a rectangular frame indicating the "packet P→C" is represented by a solid line, it means that the peripheral has transmitted this packet, but it does not indicate whether the packet has been received by the central. If the peripheral receives the "packet C→P", it will transmit the "packet P→C" after the T_IFS. Further, if the peripheral does not receive the "packet C→P", the peripheral does not transmit the "packet P→C". If the peripheral does not transmit the "packet P→C", the "packet P→C" is not represented.

The parameters such as the "transmitWindowDelay", the "transmitWindowOffset", the "transmitWindowsSize", and the "conn Interval" are notified from the central to the peripheral by being included in the CONNECT_IND packet.

Here, frequency hopping is applied to the packet exchange between the central and the peripheral. For example, the central and the peripheral communicate while changing the frequency (channel) for each connection interval. Therefore, even when one peripheral communicates with two centrals, possibility that the communication between the peripheral and one of the centrals and the communication between the peripheral and the other of the centrals will be used with the same frequency at the same timing is reduced by the frequency hopping.

However, in many cases, the communication unit of the peripheral can only transmit and receive to and from one central at the same time. Therefore, if the communication period (packet exchange period) of one of the centrals and the communication period (packet exchange period) of the other of the centrals overlap, there is a possibility that the communication of one of the centrals, which reaches first the communication timing, will be repeated and the communication of the other of the centrals will not be made. Then, the above-mentioned connection between the other of the centrals and the one peripheral, for which communication has not been permitted for a predetermined period (Supervision Timeout) starting from the connection event in which the packet exchange has succeeded, is cut off (see FIG. 1C), so that the stability of the communication may be impaired. Incidentally, for example, even if the communication period of one of the centrals and the communication period of the other of the centrals do not overlap in an initial stage, the communication period of one of the centrals and the communication period of the other of the centrals may overlap in a later stage due to the frequency deviation between the frequency of the crystal oscillator of one of the centrals and the frequency of the crystal oscillator of the other of the centrals.

Figure 1C:
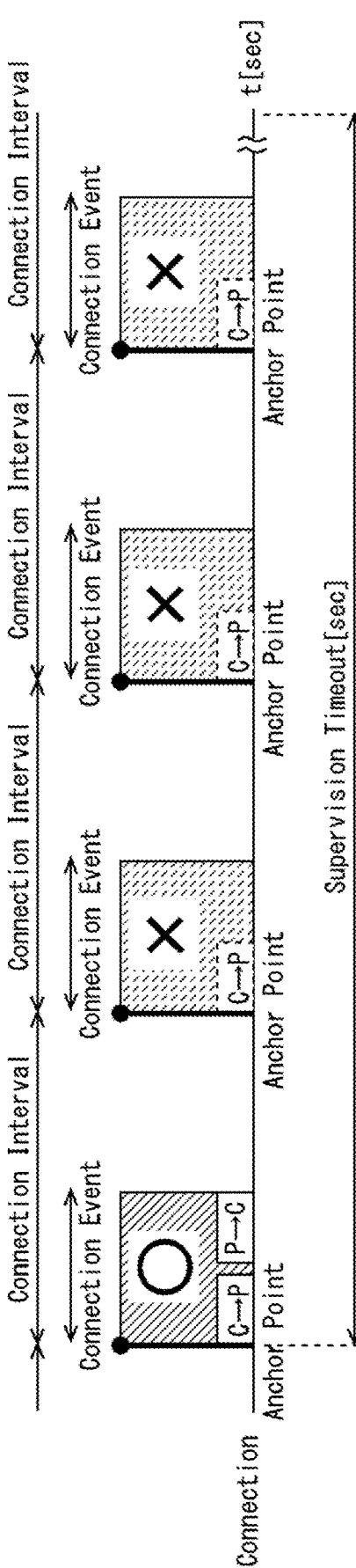
FIG. 1C is a diagram for explaining a connection/disconnection due to elapse of Supervision Timeout.

FIG. 1C is a diagram explaining connection/disconnection due to the elapse of the Supervision Timeout. The o mark shown in the "occupation possibility period" means that the communication has succeeded and a starting point of the Supervision timeout has been updated. The x mark shown in the "occupation possibility period" means that the communication failed and the starting point of the Supervision Timeout has not been updated.

First Embodiment

<Outline of System>

Figure 2:
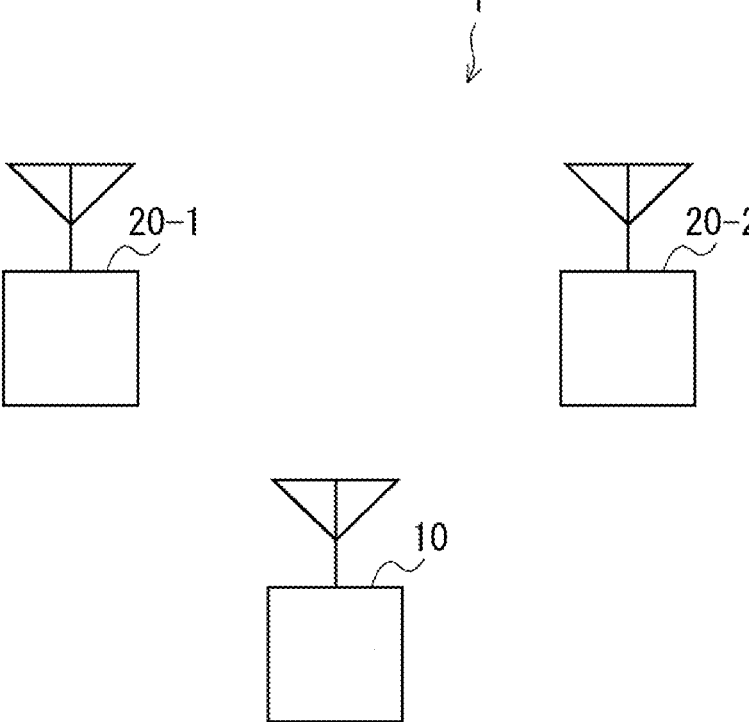
FIG. 2 is a diagram showing one example of a system according to a first embodiment.

FIG. 2 is a diagram showing one example of a system according to the first embodiment. In FIG. 2, a system 1 has a wireless communication device 10 and wireless communication devices 20-1 and 20-2. Hereinafter, the wireless communication devices 20-1 and 20-2 may simply be called the wireless communication device 20 when not distinguished. The wireless communication device 10 and the wireless communication device 20 may have the same configuration.

Here, a description will be made on the premise that the wireless communication device operating as the peripheral at certain timing is the wireless communication device 10, and the wireless communication device operating as the central at the timing is the wireless communication device 20. Incidentally, to simplify the explanation, only two wireless communication devices 20 communicating with the wireless communication device 10 are shown here, but the number of wireless communication devices 20 may be three or more. Also, hereinafter, the wireless communication device may be called a "first wireless communication device", and the wireless communication devices 20-1 and 20-2 may be called a "second wireless communication device" and a "third wireless communication device", respectively.

Configuration Example of First Wireless Communication Device

FIG. 3 is a block diagram showing one example of a first wireless communication device in the first embodiment. In FIG. 3, the wireless communication device 10 has a transmission/reception unit (communication unit) 11 and a control unit 12. The control unit 12 has a connection control unit 13, a specific unit 14, and a communication control unit 15.

The transmission/reception unit (communication unit) 11 transmits/receives wireless signals to/from a wireless communication device of a communication partner. Here, it is assumed that the transmission unit 1 reception (communication unit) 11 can only perform transmission/reception with one wireless communication device 20 at the same time. That is, it is assumed that the transmission/reception unit (communication unit) 11 can use only one channel (frequency) for the communication at one timing. It is also assumed that the transmission/reception unit (communication unit) 11 cannot transmit and receive at the one timing.

The connection control unit 13 controls establishment and disconnection of the connection with the wireless communication device 20-1 and the connection with the wireless communication device 20-2. For example, the connection control unit 13 disconnects a connection for which no packet exchange has been established only once before a supervisory timer (Supervision Timeout) expires. The connection control unit 13 also outputs a permission request for the communication of each wireless communication device to the communication control unit 15.

The specific unit 14 specifies a "priority candidate device" out of the wireless communication devices 20-1 and 20-2. Then, the specific unit 14 notifies the communication control unit 15 of information regarding the specified priority candidate device. For example, the specific unit 14 determines whether the wireless communication device 20-1 is a priority candidate device based on the possibility that the connection with the wireless communication device 20-1 will be disconnected. Further, the specific unit 14 determines whether the wireless communication device 20-2 is a priority candidate device based on the possibility that the connection with the wireless communication device 20-2 will be disconnected. This determination and the above-mentioned notification are performed at, for example, the timing before each anchor point.

For example, the specific unit 14 may use the "communication failure time", during which the communication of the wireless communication device 20-1 has not been permitted continuously, as a parameter related to the possibility that the connection with the wireless communication device 20-1 will be disconnected. Further, the specific unit 14 may use, for example, the "communication failure time", during which the connection with the wireless communication device 20-2 has not been permitted continuously, as a parameter related to the possibility that the connection with the wireless communication device 20-2 will be disconnected.

Figure 4:
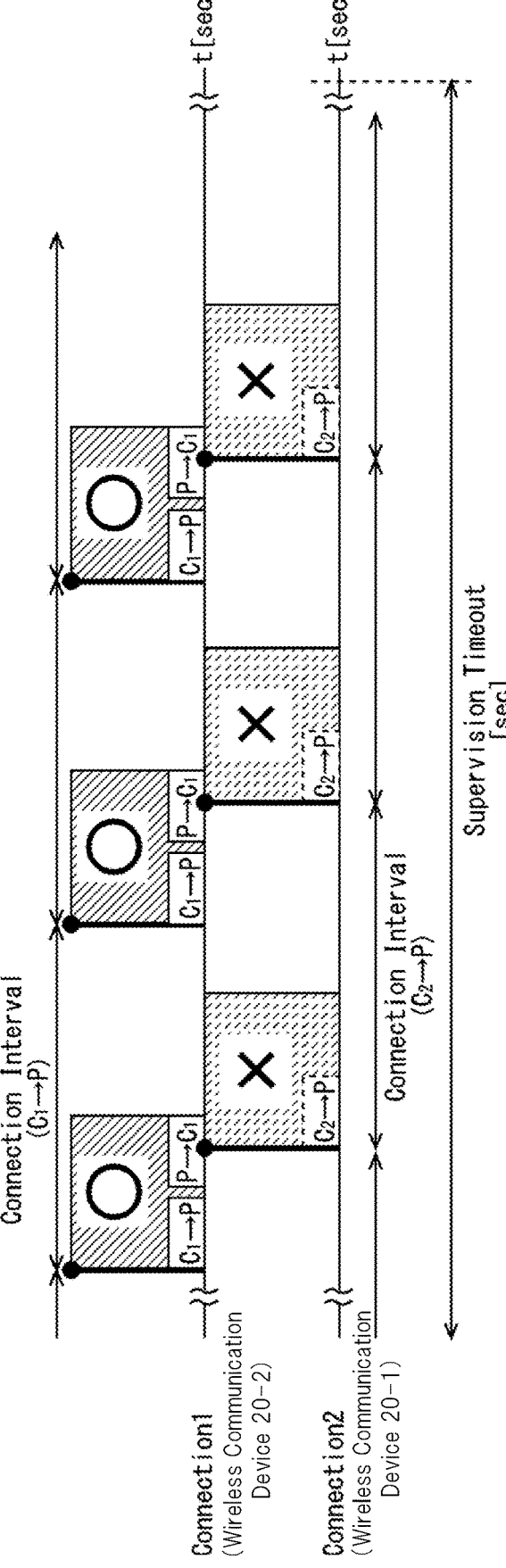
FIG. 4 is a diagram for explaining communication failure time.

Here, the "communication failure time" will be explained. FIG. 4 is a diagram for explaining the communication failure time. The "occupation possibility period (overlapping determination period)" to be described later includes at least one replacement unit period. FIG. 4 shows a case where each occupation possibility period includes one exchange unit period. Also, it shows a case where the timing of the anchor point of the wireless communication device 20-2 (connection 1) is earlier than the timing of the anchor point of the wireless communication device 20-1 (connection 2). In this case, the communication during the occupation possibility period of the wireless communication device 20-2 is continuously permitted, while the communication during the occupation possibility period of the wireless communication device 20-1 is not continuously permitted. A "communication failure time" is a value obtained by multiplying the number of connection interval periods, in which the communication during the occupation possibility period of the wireless communication device 20-1 is not permitted continuously, by a length of time (Connection Interval) in the connection interval period. The number of connection interval periods, in which the communication during the occupation possibility period of the wireless communication device 20-1 is not permitted continuously, is counted by the communication control unit 15.

For example, as shown in FIG. 3, the specific unit 14 has a calculation unit 14A and a determination unit 14B.

The calculation unit 14A calculates the "communication failure time" by multiplying the above-counted "number of connection interval periods, in which the communication is not permitted consecutively", by the length of time (Connection Interval) of the connection interval period. This "communication failure time" is calculated for each of the wireless communication devices 20-1 and 20-2. The calculation unit 14A also calculates a threshold (hereinafter sometimes called a "first threshold") by multiplying an initial value of a supervisory timer (Supervision Timeout) by a predetermined coefficient less than 1. A value of the predetermined coefficient may be ½, for example.

If the value of the communication failure time calculated for the wireless communication device 20 to be determined is greater than a first threshold, the determination unit 14B determines that the wireless communication device 20 to be determined is a "priority candidate device". That is, the wireless communication device 20 to be determined, for which time until the supervisory timer (Supervision Timeout) expires is shorter than a predetermined level is determined, is determined as the "priority candidate device". The determination unit 14B notifies the communication control unit 15 of the information regarding the specified priority candidate device.

Incidentally, here, although the "communication failure time" is used, as it is, to determine the "priority candidate device", the present disclosure is not limited to this.

For example, the calculation unit 14A may calculate the time until the supervisory timer (Supervision Timeout) expires (namely, remaining time) by subtracting the "communication failure time" from the initial value of the supervisory timer (Supervision Timeout). Then, the calculation unit 14A may calculate the first threshold by multiplying the initial value (Supervision Timeout) of the supervisory timer by a predetermined coefficient less than ½. Then, if the remaining time calculated for the wireless communication device 20 to be determined is smaller than the first threshold, the determination unit 14B may determine that the wireless communication device 20 to be determined is the "priority candidate device".

Further, for example, the calculation unit 14A may calculate the first threshold by multiplying the number of connection intervals (Connection Interval) included in the initial value (Supervision Timeout) of the supervisory timer by a predetermined coefficient less than 1. Then, when "the number of connection interval periods in which the communication is not permitted continuously" counted for the wireless communication device 20 to be determined is greater than the first threshold, the determination unit 14B may determine that the wireless communication device 20 to be determined is the "priority candidate device".

Further, for example, the calculation unit 14A may calculate "the remaining number of times" by subtracting "the number of connection interval periods in which the communication is not permitted continuously" counted for the wireless communication device 20 to be determined from the number of connection interval periods (Connection Interval) included in the initial value (Supervision Timeout) of the supervisory timer. "The remaining number of times" is the number of connection interval periods until the supervisory timer (Supervision Timeout) expires. Then, the calculation unit 14A may calculate the first threshold by multiplying the number of connection interval periods (Connection Interval) included in the initial value (Supervision Timeout) of the supervisory timer by the predetermined coefficient less than ½. Then, if the remaining number of times calculated for the wireless communication device 20 to be determined is smaller than the first threshold, the determination unit 14B may determine that the wireless communication device 20 to be determined is the "priority candidate device".

As one example, the following description will be made based on the premise that the "priority candidate device" is determined by using the "communication failure time" as it is.

When the communication control unit 15 receives a "permission request" for the communication with the wireless communication device 20 from the connection control unit 13, it determines whether to grant the permission to the communication. This determination may be made, for example, at timing before each anchor point.

For example, when the communication control unit 15 receives the permission requests for the communication with each of the wireless communication devices 20-1 and 20-2, it grants the permission to the communication with the "priority candidate device". Then, the communication control unit 15 grants, to the communication of a "non-priority candidate device" out of the wireless communication devices 20-1 and 20-2, the permission during the "occupation possibility period" occupied by the communication of the non-priority candidate device, which does not overlap with the "occupation possibility period" occupied by the communication of the priority candidate device. Meanwhile, the communication control unit 15 does not grant, to the communication of the "non-priority candidate device", the permission during all or part of the occupation possibility period occupied by the communication of the non-priority candidate device, which overlaps with the occupation possibility period occupied by the communication of the priority candidate device.

Figure 5:
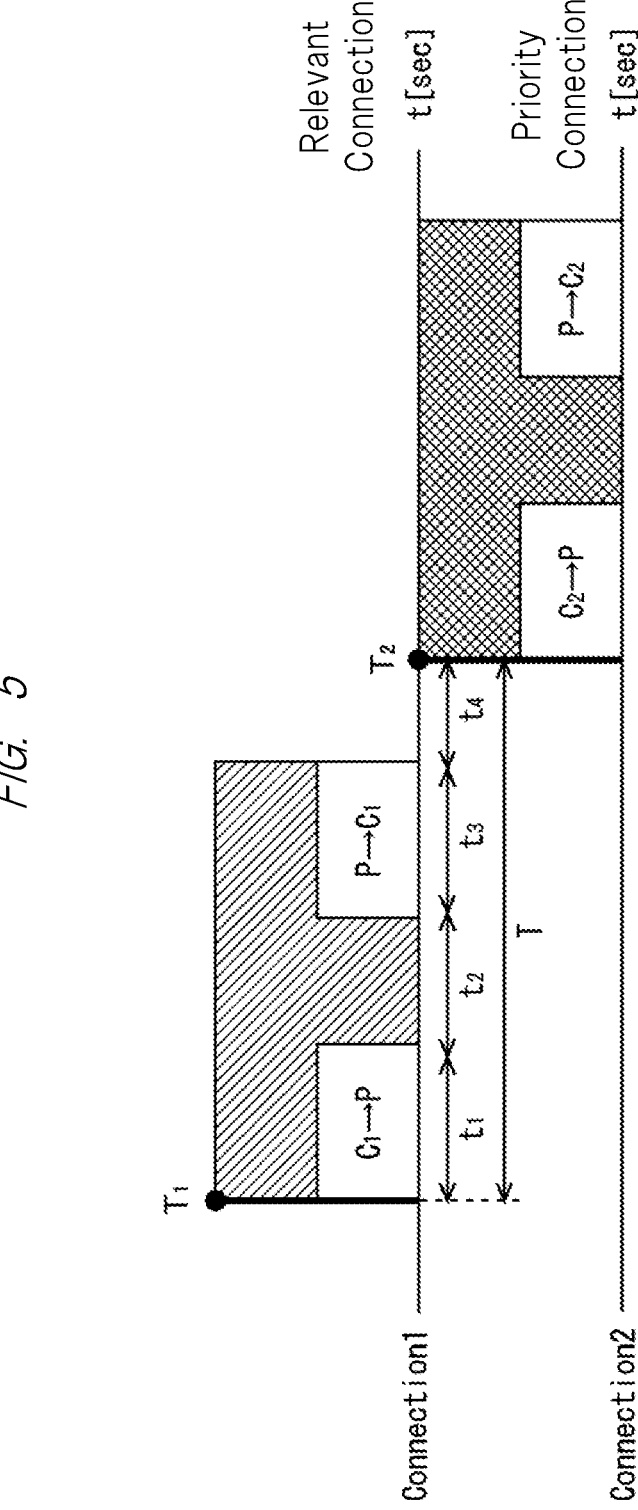
FIG. 5 is a diagram for explaining an occupation possibility period.

Here, the "occupation possibility period (overlapping determination period)" will be explained. FIG. 5 is a diagram for explaining the occupation possibility period. In FIG. 5, a "relevant connection" corresponds to the connection of the non-priority candidate device, and a "priority connection" corresponds to the connection of the priority candidate device. In FIG. 5, one anchor point for the connection of the non-priority candidate device is represented by time T1, and one anchor point for the connection of the priority candidate device is represented by time T2. The occupation possibility period is represented by T ($=$t1+ t2+t3+t4) in FIG. 5. t1 is transmission time of a packet transmitted from the central to the peripheral. t2 is an interval between the packets (T_IFS, idle time). t3 is transmission time of the packet transmitted from the peripheral to the central. t4 is overhead time required for channel switching. Incidentally, here, a case where the occupation possibility period includes one exchange unit period is shown.

Figures 6, 7:
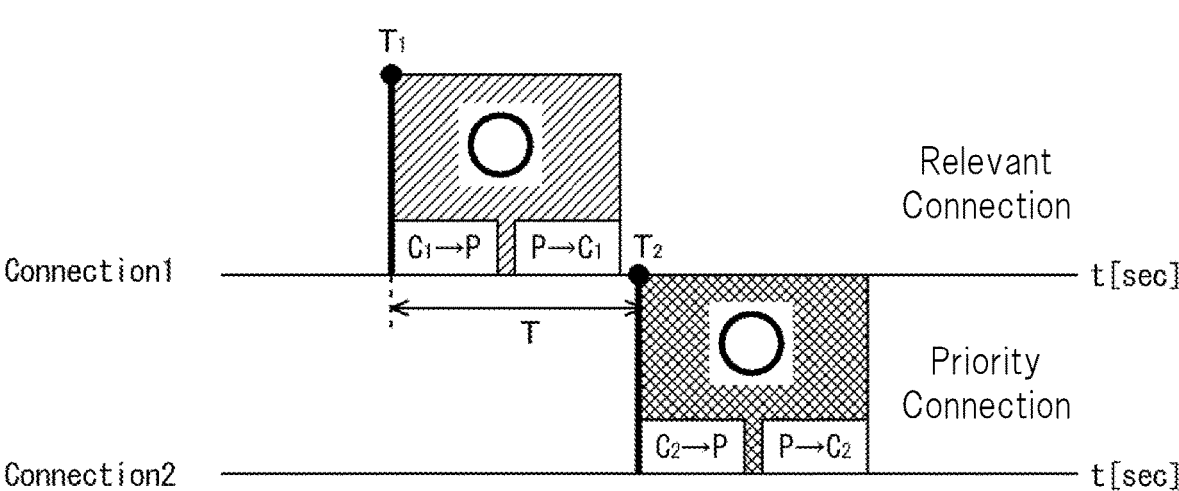
FIG. 6 is a diagram for explaining a determination of permission/non-permission of communication.
FIG. 7 is a diagram for explaining the determination of the permission/non-permission of the communication.

FIGS. 6 and 7 are diagrams for explaining determination of permission/non-permission of the communication. In situations shown in FIGS. 6 and 7, the communication control unit 15 grants the permission to the communication with the "priority candidate device". Further, as shown in FIG. 6, the communication control unit 15 grants, to the communication of the "non-priority candidate device", the permission during the "occupation possibility period" of the non-priority candidate device, which does not overlap with the "occupation possibility period" of the priority candidate device. Meanwhile, as shown in FIG. 7, the communication control unit 15 does not grant, to the communication of the "non-priority candidate device", the permission during the occupation possibility period of the non-priority candidate device, which overlaps with the occupation possibility period of the priority candidate device.

Operation Example of First Wireless
Communication Unit

FIG. 8 is a flowchart showing one example of a processing operation of the communication control unit in the first wireless communication device according to the first embodiment. A processing flow shown in FIG. 8 is executed for each wireless communication device 20. Also, the processing flow shown in FIG. 8 starts at timing before each anchor point, for example.

The communication control unit 15 waits until it receives a permission request from the connection control unit 13 (step S11 NO). Upon receiving the permission request (step S11 YES), the communication control unit 15 performs a "permission determination processing" (step S12). The "permission determination processing" will be described later with reference to FIG. 9. Incidentally, the connection control unit 13 may output the permission request for communication of each wireless communication device 20 to the communication control unit 15 at the timing before the anchor point for each wireless communication device 20.

The communication control unit 15 determines whether the permission request has been permitted in the "permission determination processing" (step S13).

When it is determined in the "permission determination processing" that the permission request is not permitted (step S13 NO), the communication control unit 15 increments the "number of communication failures" for the wireless communication device 20 related to the permission request (step S14).

If it is determined in the "permission determination processing" that the permission request has been permitted (YES at step S13), the communication control unit 15 notifies the connection control unit 13 that the permission request is granted (step S15). Consequently, the connection control unit 13 controls a channel of the transmission/reception unit (communication unit) 11 so as to switch a channel of the wireless communication device 20 related to the permission request. Then, an attempt is made at a packet exchange between the wireless communication device 20 and the wireless communication device 10 that are related to the permission request.

The communication control unit 15 determines whether the packet exchange has been established (step S16).

If it is determined that the packet exchange has not been established (step S16 NO), the communication control unit 15 increments the "number of communication failures" for the wireless communication device 20 related to the permission request (step S14).

If it is determined that the packet exchange has been established (step S16 YES), the communication control unit 15 clears the "number of communication failures" for the wireless communication device 20 related to the permission request (step S17).

FIG. 9 is a flowchart showing one example of a permission determination processing.

The communication control unit 15 determines whether the permission request is for the communication of the priority candidate device (step S21).

If it is determined that the permission request is for the communication of the priority candidate device (step S21 YES), the communication control unit 15 grants the permission to the permission request (step S22).

If it is determined that the permission request is not for the communication of the priority candidate device (step S21 NO), namely, if it is determined that the permission request is for the communication of the non-priority candidate device, the communication control unit 15 determines whether the "occupation possibility period" of the non-priority candidate device overlaps with the "occupation possibility period" of the priority candidate device (step S23).

If it is determined that the "occupation possibility period" of the non-priority candidate device overlaps with the "occupation possibility period" of the priority candidate device (step S23 YES), the communication control unit 15 does not grant the permission to the permission request (step S24).

If it is determined that the "occupation possibility period" of the non-priority candidate device does not overlap with the "occupation possibility period" of the priority candidate device (step S23 NO), the communication control unit 15 determines whether the transmission/reception unit (communication unit) 11 is being used (is in use) for another connection (namely, a connection of a wireless communication device different from the wireless communication device 20 related to the permission request) (step S25).

If it is not being used for another connection (step S25 NO), the communication control unit 15 grants the permission to the permission request (step S22). If it is being used for another connection (step S25 YES), the communication control unit 15 does not grant the permission to the permission request (step S24). That is, with respect to communications of a plurality of non-priority candidate devices, the permission is granted to the communication of the non-priority candidate device for which the permission request has been issued first.

(Processing Operation of Specific Unit)

FIG. 10 is a flowchart showing one example of a processing operation of the specific unit in the first wireless communication device according to the first embodiment. This processing is, for example, repeated for each wireless communication device 20 at each connection interval. Also, a processing flow shown in FIG. 10 starts at the timing before each anchor point, for example.

The specific unit 14 calculates the "communication failure time" for the wireless communication device 20 to be determined (step S31). That is, the specific unit 14 calculates the "communication failure time" by multiplying the "number of communication failures" counted in step S14 for the wireless communication device 20 to be determined by the length of time (Connection Interval) in the connection interval period.

The specific unit 14 determines whether the "communication failure time" calculated for the wireless communication device 20 to be determined is greater than the first threshold (step S32).

If the "communication failure time" calculated for the wireless communication device 20 to be determined is greater than the first threshold (step S32 YES), the specific unit 14 notifies the communication control unit 15 that the wireless communication device 20 to be determined is the "priority candidate device" (step S33). Then the flow ends.

If the "communication failure time" calculated for the wireless communication device 20 to be determined is the first threshold or less (step S32 NO), the flow ends.

As described above, according to the first embodiment, the specific unit 14 in the wireless communication device 10 determines whether the wireless communication device 20 is the priority candidate device based on the possibility that the communication with the wireless communication device 20 will be disconnected. Upon receiving the permission request for the communication with the wireless communication device 20, the communication control unit 15 grants the permission to the communication with the "priority candidate device".

With this configuration of the wireless communication device 10, it is possible to prioritize the communication of the wireless communication device 20 which has the high possibility that the connection will be disconnected, so that the stability of the communication can be ensured.

Second Embodiment

A second embodiment relates to a case where one connection interval period includes a plurality of exchange unit periods, namely, a case where one occupation possibility period includes the plurality of exchange unit periods. That is, for example, in BLE (Bluetooth Low Energy), when data to be transmitted is larger than 247 bytes and cannot fit in one packet, the data is divided into a plurality of packets and transmitted (More Data function). Incidentally, since basic configurations of the system and the first wireless communication device of the second embodiment are the same as those of the system 1 and the wireless communication device 10 of the first embodiment, they will be described with reference to FIGS. 2 and 3.

In a wireless communication device 10 of the second embodiment, when each occupation possibility period includes the plurality of exchange unit periods, the communication control unit 15 grants the permission to the communication with the non-priority candidate device in the exchange unit periods of the non-priority candidate device, which do not overlap with the occupation possibility period of the priority candidate device. Meanwhile, the communication control unit 15 does not grant the permission to the communication with the non-priority candidate device during the exchange unit period of the non-priority candidate device, which overlaps with the occupation possibility period of the priority candidate device. That is, the communication control unit 15 of the second embodiment determines, for each exchange unit period of the non-priority candidate device, whether the exchange unit period overlaps with the occupation possibility period of the priority candidate device.

Figure 11:
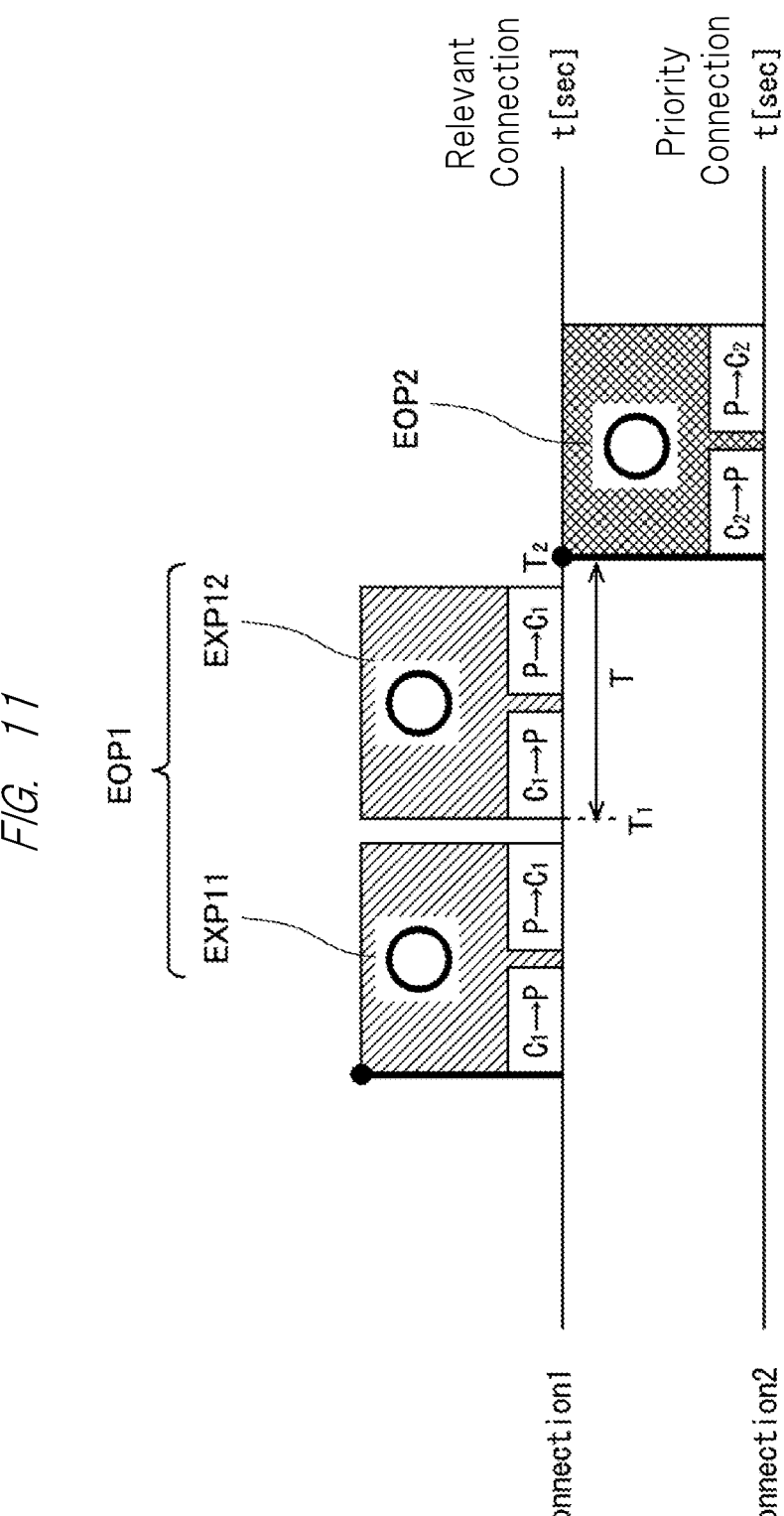
FIG. 11 is a diagram for explaining a processing operation of a communication control unit in a second embodiment.
Figure 12:
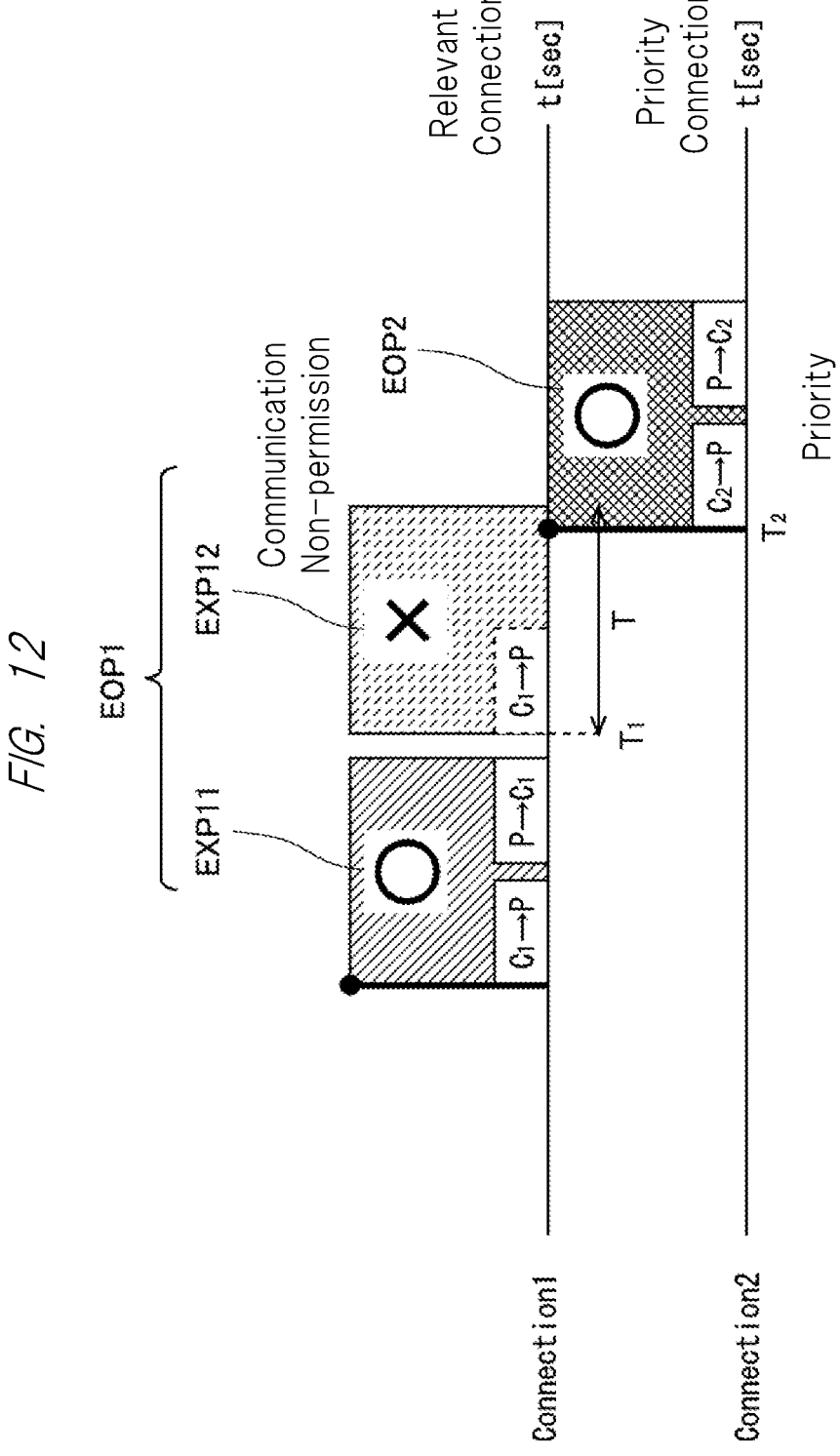
FIG. 12 is a diagram for explaining the processing operations of the communication control unit in the second embodiment.

FIGS. 11 and 12 are diagrams for explaining the processing operation of the communication control unit in the second embodiment.

In FIG. 11, an occupation possibility period EOP1 of the non-priority candidate device has an exchange unit period EXP11 and an exchange unit period EXP12. Then, neither the exchange unit period EXP11 nor the exchange unit period EXP12 overlaps the occupation possibility period EOP2 of the priority candidate device. In such a situation, the communication control unit 15 grants the permission to the communication with the non-priority candidate device during the entire occupation possibility period EOP1 (namely, during both the exchange unit period EXP11 and the exchange unit period EXP12).

In FIG. 12, the occupation possibility period EOP1 of the non-priority candidate device has an exchange unit period EXP11 and an exchange unit period EXP12. Then, the exchange unit period EXP11 does not overlap with the occupation possibility period EOP2 of the priority candidate device, while the exchange unit period EXP12 overlaps with the occupation possibility period EOP2 of the priority candidate device. In such a situation, the communication control unit does not grant the permission to the communication with the non-priority candidate device during part of the occupation possibility period EOP1. That is, the communication control unit 15 grants the permission to the communication with the non-priority candidate device during the exchange unit period EXP11, while not granting the permission thereto during the exchange unit period EXP12.

Modification Example

<1> In the above-mentioned description, for each exchange unit period of the non-priority candidate device, the communication control unit 15 determines whether the exchange unit period with overlaps the occupation possibility period of the priority candidate device. Then, based on its result, the communication control unit 15 determines whether to grant the permission to the communication with the non-priority candidate device for each exchange unit period, but the present disclosure is not limited to this.

For example, even if one occupation possibility period includes the plurality of exchange unit periods, the communication control unit 15 may determine whether the occupation possibility period overlaps with the occupation possibility period of the priority candidate device for each occupation possibility period of the non-priority candidate device. Then, based on its result, the communication control unit 15 may determine whether to grant the permission to the communication with the non-priority candidate device for each occupation possibility period.

Figure 13:
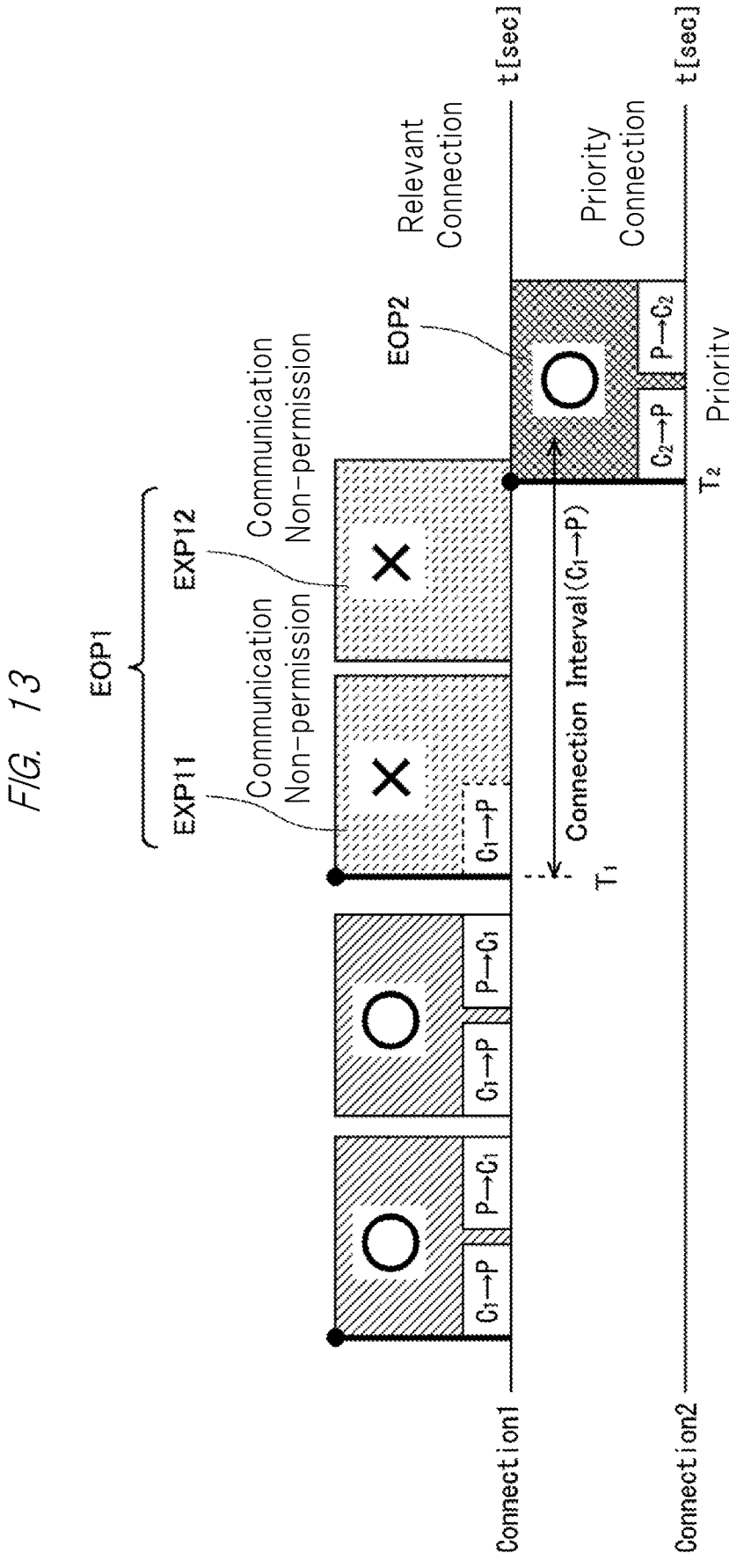
FIG. 13 is a diagram for explaining a processing operation of a communication control unit in a modification example <1> of the second embodiment.

FIG. 13 is a diagram for explaining a processing operation of a communication control unit in the modification example <1> of the second embodiment. In FIG. 13, the occupation possibility period EOP1 of the non-priority candidate device has an exchange unit period EXP11 and an exchange unit period EXP12. Then, part of the occupation possibility period EOP1 of the non-priority candidate device (exchange unit period EXP12) overlaps with the occupation possibility period EOP2 of the priority candidate device. In this situation, the communication control unit 15 of the modification example <1> of the second embodiment does not grant the permission to the communication with the non-priority candidate device during the occupation possibility period EOP1.

<2> Further, for example, the communication control unit may not grant the permission to the communications of the non-priority candidate devices during the occupation possibility periods of all the non-priority candidate devices existing from the timing when any wireless communication device is determined to be the priority candidate device to an occupation possibility period next coming for the priority candidate device.

Figure 14:
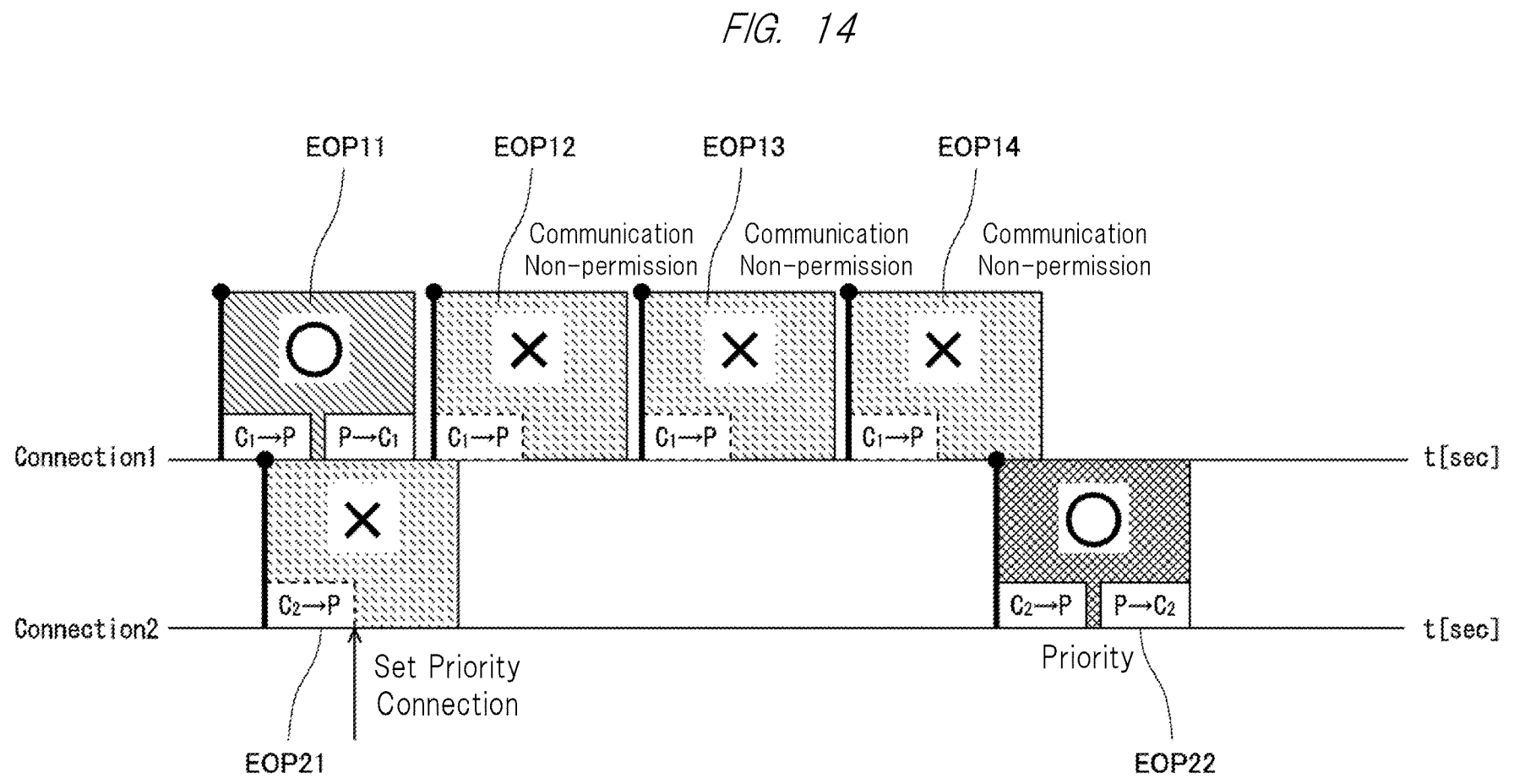

FIG. 14 is a diagram for explaining a processing operation of a communication control unit in the modification example <2> of the second embodiment. In FIG. 14, the communication of the wireless communication device corresponding to connection 2 is not permitted during the occupation possibility period EOP21, and the wireless communication device corresponding to connection 2 becomes the priority candidate device at that timing. In this situation, the communication control unit 15 does not grant the permission to the communications of the non-priority candidate devices during the occupation possibility periods EOP12, EOP13, and EOP14 of the non-priority candidate devices, which exist until an occupation possibility period EOP22 next coming for the priority candidate device.

<3> Three variations of the processing operations of the communication control units 15 described in the second embodiment and the modification examples <1> and <2> of the second embodiment may be switched appropriately. The variation of the second embodiment can reduce the number of packets for which the communication is not permitted, while sine a determination frequency is increased, a load on resources becomes large. In addition, the variation of the modification example <1> can reduce the load on resources since the determination frequency is lowered, but the number of packets for which the communication is not permitted increases.

Third Embodiment

A third embodiment relates to an embodiment in which when the number of consecutive connection interval periods in which the communication with the priority candidate device is not established becomes a second threshold or more, the permission is not granted to the communication with the priority candidate device during the predetermined number of connection interval periods. Incidentally, basic configurations of a system and a first wireless communication device of the third embodiment are the same as those of the system 1 of the first embodiment, so that they will be described with reference to FIG. 2. That is, a system 1 of the third embodiment has a wireless communication device 30, which will be described later, instead of the wireless communication device 10.

Configuration Example of First Wireless Communication Device

Figure 15:
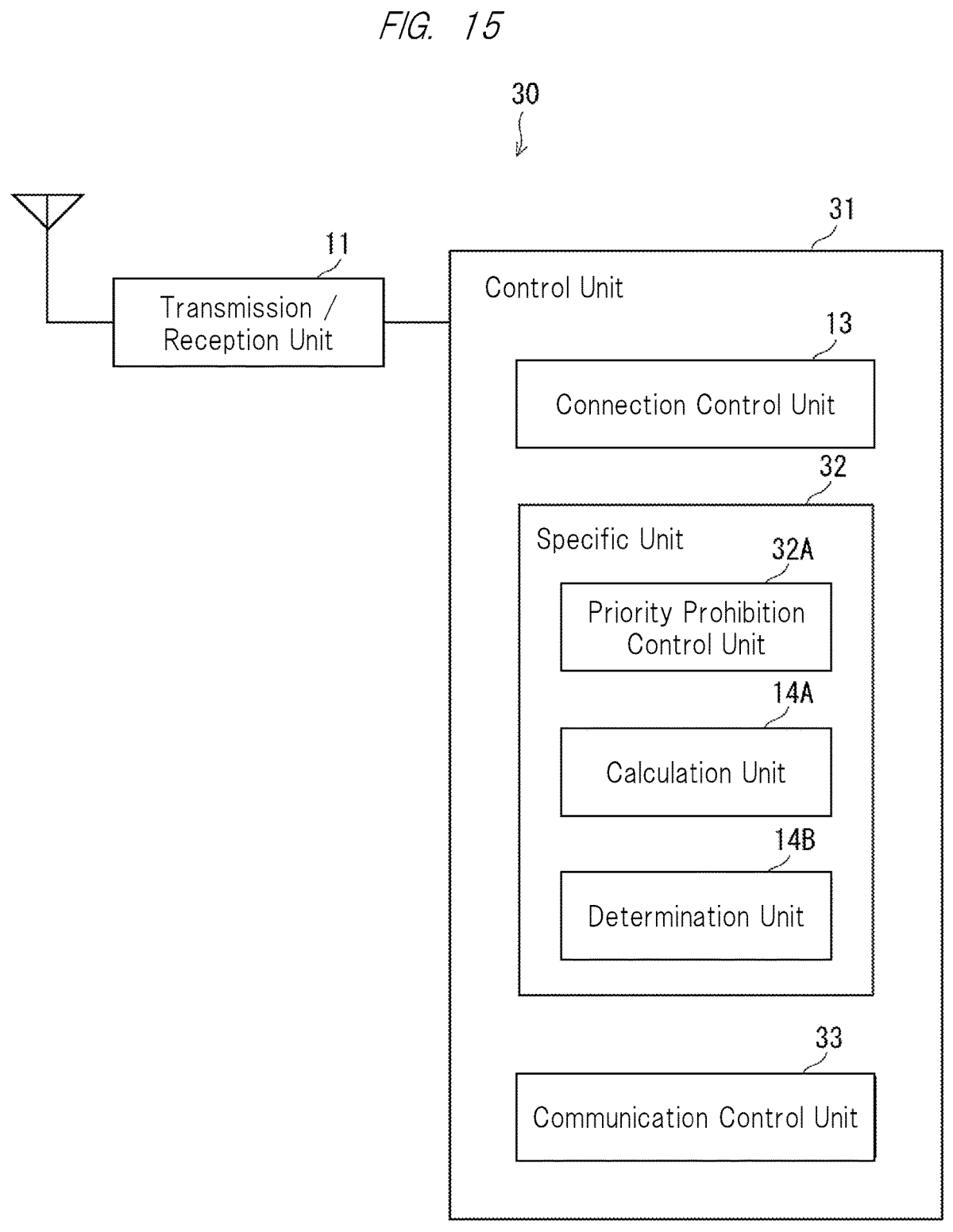

FIG. 15 is a block diagram showing one example of the first wireless communication device in the third embodiment. In FIG. 15, the wireless communication device 30 has a transmission/reception unit (communication section) 11 and a control unit 31. The control unit 31 has a connection control unit 13, a specific unit 32, and a communication control unit 33.

The specific unit 32 specifies a "priority candidate device" out of the wireless communication devices 20-1 and 20-2 in the same manner as the specific unit 14 of the first embodiment. However, when the "number of failures" of the wireless communication device 20 to be determined is a threshold or more, the specific unit 32 does not perform a processing for specifying whether the wireless communication device 20 to be determined is the "priority candidate device". That is, when the "number of failures" of the wireless communication device 20 to be determined is the threshold or more, the wireless communication device 20 to be determined is treated as the "non-priority candidate device". Then, when the "number of failures" of the wireless communication device 20 to be determined is less than the threshold, the specific unit 32 performs a processing for specifying whether the wireless communication device 20 to be determined is the "priority candidate device". That is, the specific unit 32 calculates or the like the "communication failure time" when the "number of failures" of the wireless communication device to be determined is less than the threshold.

For example, the specific unit 32 has a priority prohibition control unit 32A, a calculation unit 14A, and a determination unit 14B.

The priority prohibition control unit 32A sets a when the number of "priority prohibition counter" consecutive failures in the communication during the occupation possibility period for each wireless communication device 20 (namely, the "number of failures") reaches the threshold or more. That is, an initial value of the "priority prohibition counter" is set. Then, the priority prohibition control unit 32A decrements the priority prohibition counter each time the connection interval for each wireless communication device 20 elapses. When a value of this priority prohibition counter is not "zero", the corresponding wireless communication device 20 is treated as the non-priority candidate device.

When the "priority prohibition counter" is not set or when the value of the "priority prohibition counter" is "zero", the calculation unit 14A calculates a "communication failure time".

The communication control unit 33 basically performs the same processing operations as those of the communication control unit 15 of the first embodiment. However, unlike the communication control unit 15 of the first embodiment, the communication control unit 33 manages the "number of failures".

Operation Example of First Wireless Communication Device

One example of a processing operation of the wireless communication device 30 having the above-mentioned configuration will be described.

(Processing Operation of Communication Control Unit)

Figure 16:
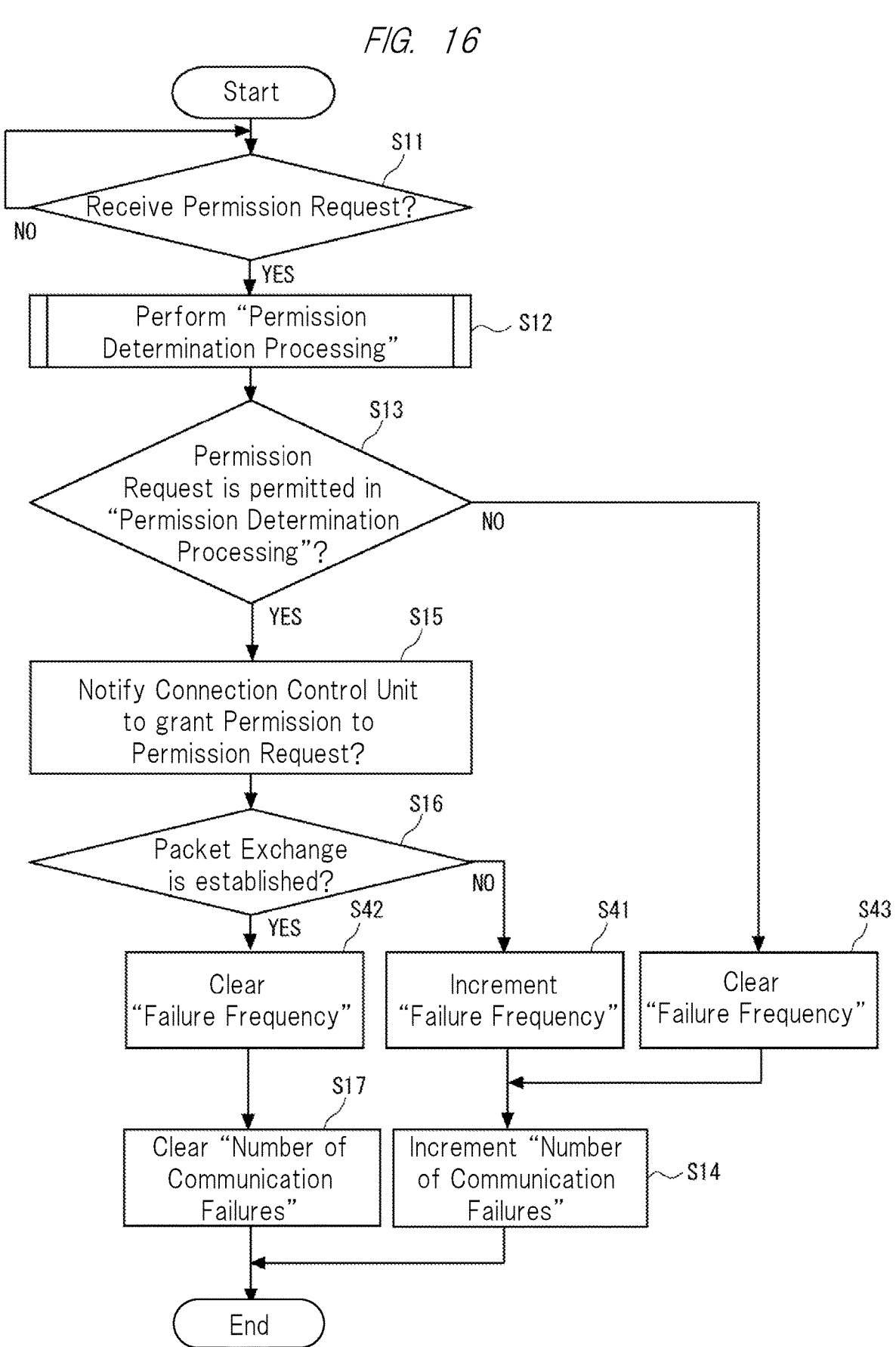
FIG. 16 is a flow chart showing one example of the processing operations of the communication control unit in the first wireless communication device of the third embodiment.

FIG. 16 is a flowchart showing one example of processing operations of the communication control unit in the first wireless communication device according to the third embodiment. The processing flow shown in FIG. 16 is executed for each wireless communication device 20. Also, the processing flow shown in FIG. 16 starts at timing before each anchor point, for example. Incidentally, in the following, a difference in the processing flow of FIG. 8 will be mainly described in the processing flow of FIG. 16.

When it is determined that the packet exchange has not been established (step S16 NO), the communication control unit 33 increments the "number of failures" for the wireless communication device 20 related to the permission request (step S41). In this way, the number of times when the communication is not established despite the permission to the permission request being granted is counted. Then, the communication control unit 33 increments the "number of communication failures" for the wireless communication device 20 related to the permission request (step S14).

When it is determined that the packet exchange has been established (step S16 YES), the communication control unit 33 clears the "number of failures" for the wireless communication device 20 related to the permission request (step S42). Then, the communication control unit 33 clears the "number of communication failures" for the wireless communication device 20 related to the permission request (step S17).

If it is determined in the "permission determination processing" that the permission request is not permitted (step S13 NO), the communication control unit 33 clears the "number of failures" for the wireless communication device related to the permission request (step S43). Then, the communication control unit 33 increments the "number of communication failures" for the wireless communication device 20 related to the permission request (step S14).

(Processing Operation of Specific Unit)

Figure 17:
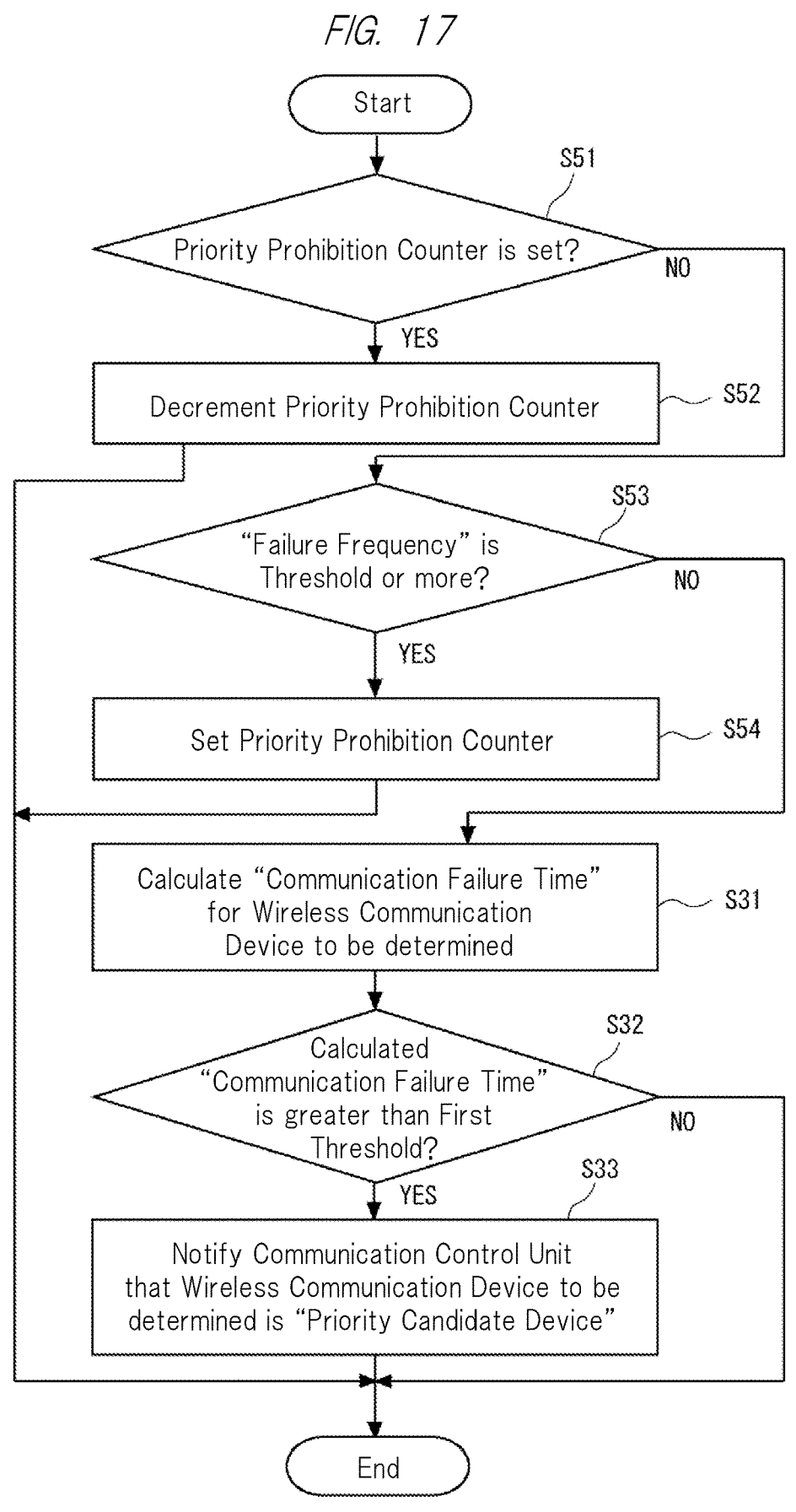

FIG. 17 is a flowchart showing one example of a processing operation of the specific unit in the first wireless communication device according to the third embodiment. This processing is, for example, repeated for each wireless communication device 20 at each connection interval. Also, a processing flow shown in FIG. 17 starts at timing before each anchor point, for example. Incidentally, in the following, a difference in the processing flow of FIG. 10 will be mainly described in the processing flow of FIG. 17.

A specific unit 32 determines whether the priority prohibition counter is set for the wireless communication device 20 to be determined (whether a value of the priority prohibition counter is zero) (step S51).

When the priority prohibition counter is not set (step S51 NO), the specific unit 32 determines whether the "number of failures" for the wireless communication device 20 to be determined is the threshold or more (step S53).

When the "number of failures" for the wireless communication device 20 to be determined is the threshold or more (step S53 YES), the specific unit 32 sets the priority prohibition counter for the wireless communication device 20 to be determined (step S54). That is, an initial value of the "priority prohibition counter" is set.

When the priority prohibition counter is set (the value of the priority prohibition counter is not zero) (step S51 YES), the specific unit 32 decrements the priority prohibition counter.

When the "number of failures" for the wireless communication device 20 to be determined is less than the threshold (step S53 NO), the specific unit 32 calculates the "communication failure time" for the wireless communication device 20 to be determined (step S31). In this way, while the "number of failures" for the wireless communication device 20 to be determined is the threshold or more and the value of the non-zero priority prohibition counter is set, the wireless communication device 20 to be determined is not treated as the priority candidate device. Consequently, for example, when the wireless communication device 20 once specified as the priority candidate device is in a situation in which the communication is impossible (for example, in a power-OFF state), it is possible to avoid continuity granting the unnecessary permission to the communication of the wireless communication device 20.

Figure 18:
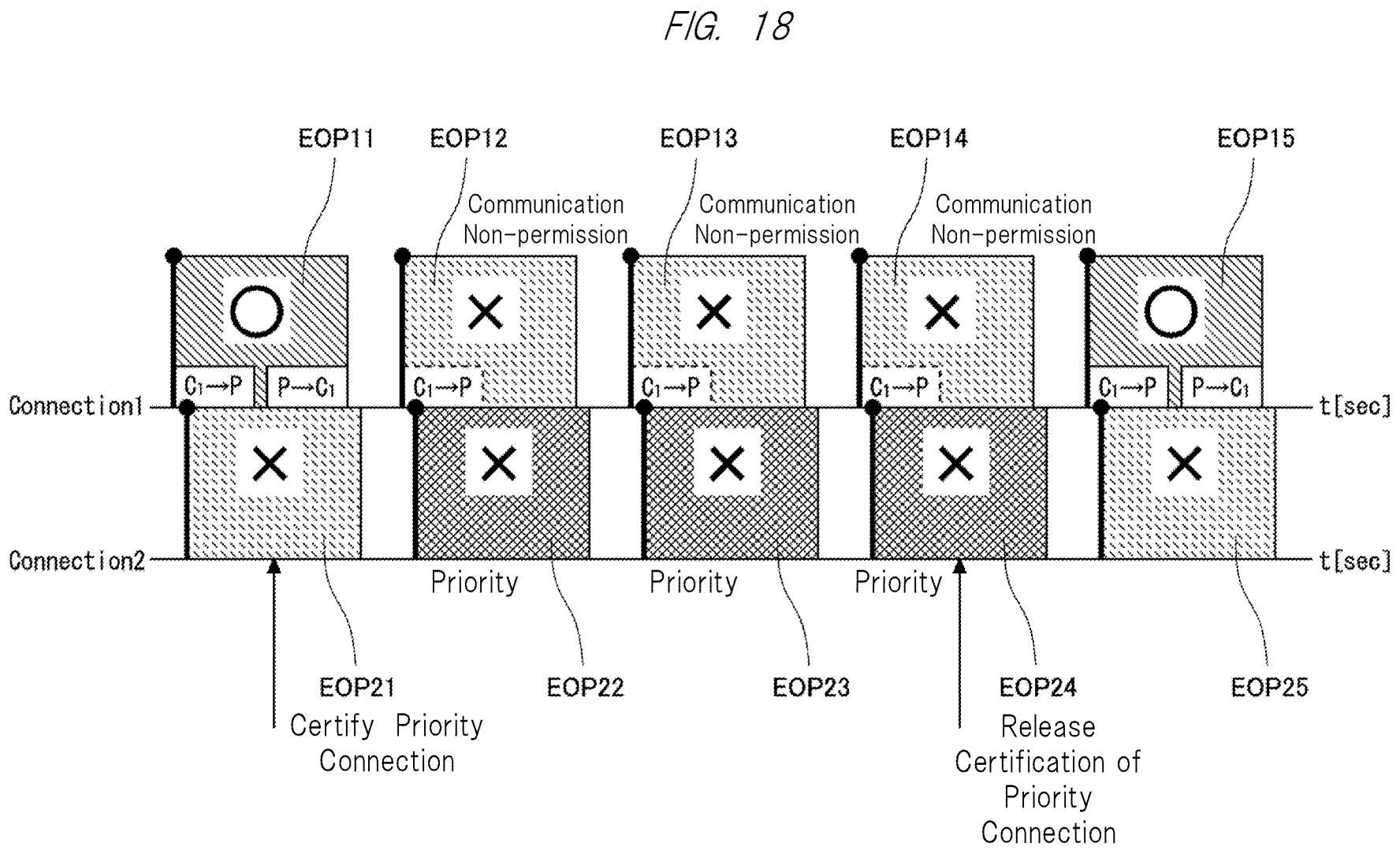

FIG. 18 is a diagram for explaining one example of the processing operation of the first wireless communication device of the third embodiment. As shown in FIG. 18, the permission is granted to the communication of connection 1 during the occupation possibility period EOP11, and the permission to the communication of connection 2 is not granted during the occupation possibility period EOP21. Therefore, it is assumed that the wireless communication device 20 corresponding to connection 2 satisfies a condition of the priority candidate device at the timing before the occupation possibility period EOP22. Therefore, the permission to the communication of the priority candidate device is granted during the occupation possibility period EOP22, the occupation possibility period EOP23, and the occupation possibility period EOP24, but the communication of the priority candidate device is not established here. At this time, assuming that a value of the threshold used in step S53 is 3, the "priority prohibition counter" is set for the wireless communication device 20 corresponding to connection 2. Consequently, the communication during the occupation possibility period EOP15, in which the anchor point comes early, is permitted, while the communication during the occupation possibility period EOP25 is not permitted.

Another Embodiment

<1> The first wireless communication device of the first to third embodiments may have other modes for granting the permission to the communication. For example, in a first other mode, the permissions to the communication of the wireless communication device 20-1 and the communication of the wireless communication device 20-2, in which the mutual occupation possibility periods overlap, may be granted according to a predetermined pattern. For example, the permission may be granted alternately to the communication of the wireless communication device and the 20-1 communication of the wireless communication device 20-2. Alternatively, the permission to the communication of the wireless communication device 20-2 may be granted according to the predetermined pattern. For example, the permissions to the communication of the wireless communication device 20-1 and the communication of the wireless communication device 20-2 may be granted at a predetermined ratio (for example, a ratio of 3:2).

<2> In the first to third embodiments, if there are a plurality of priority candidate devices, a "priority level" may be assigned to each priority candidate device, and the permission may be preferentially granted to the communication of the priority candidate device with a high "priority level". For example, by using parameters (remaining time until the Supervision Timeout and the like come) relating to each priority candidate device, the priority level may be determined based on magnitude of the parameter. For example, the permission may be preferentially granted to the communication of the priority candidate device with the shortest remaining time until the Supervision Timeout comes.

Figure 19:
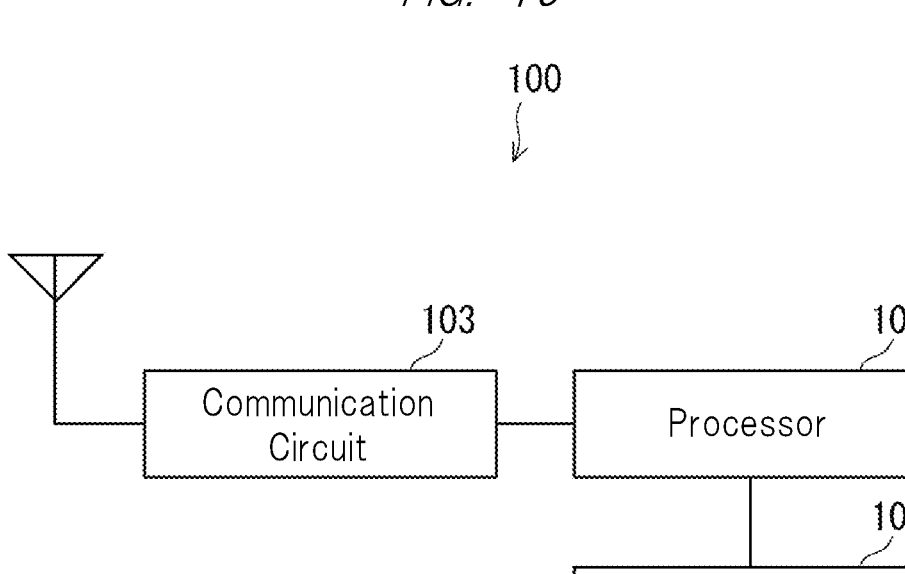
FIG. 19 is a diagram showing a hardware configuration example of a wireless communication device.

<3> FIG. 19 is a diagram showing a hardware configuration example of a wireless communication device. In FIG. 19, a wireless communication device 100 has a processor 101, a memory 102, and a communication circuit 103. The processor 101 may be, for example, a microprocessor, an MPU (Micro Processing Unit), or a CPU (Central Processing Unit). The processor 101 may include a plurality of processors. The memory 102 is configured by a combination of a volatile memory and a non-volatile memory. The memory 102 may include a storage located away from the processor 101. In this case, the processor 101 may access the memory 102 via a non-shown I/O interface.

The wireless communication devices 10, 20, and 30 of the first to third embodiments can each have the hardware configuration shown in FIG. 19. The control units 12 and 31 of the wireless communication devices 10, 20 and 30 of the first to third embodiments may be realized by the processor 101 reading and executing a program stored in the memory 102. The transmitter/receiver unit 11 may be realized by the communication circuit 103. The program can be stored by using various types of non-transitory computer readable media and provide them to the wireless communication devices 10, 20, and 30. Examples of the non-transitory computer-readable media include magnetic recording media (for example, flexible disks, magnetic tapes, hard disk drives), magneto-optical recording media (for example, magneto-optical disks). Further, the examples of the non-transitory computer readable media include CD-ROMs (Read Only Memory), CD-Rs, and CD-R/Ws. Furthermore, the examples of the non-transitory computer-readable media include semiconductor memories. The semiconductor memories include, for example, mask ROMS, PROMS (Programmable ROMs), EPROMS (Erasable PROMs), flash ROMs, and RAMs (Random Access Memories. In addition, the programs may also be provided to the wireless communication devices 10, 20, and 30 by various types of transitory computer readable media. Examples of the transitory computer-readable media include electrical signals, optical signals, and electromagnetic waves. The temporary computer-readable medium can supply the programs to the wireless communication devices 10, 20, and 30 via wired communication channels such as wires and optical fibers, or wireless communication channels.

Although the invention made by the present inventor (s) has been specifically described above based on the embodiments, the present invention is not limited to the embodiments already described and, needless to say, can be variously modified without departing from the scope of the invention.

What is claimed is:

1. A first wireless communication device capable of establishing each of a connection with a second wireless communication device and a connection with a third wireless communication device and communicating with them, the first wireless communication device comprising:
   a connection control unit controlling establishment and disconnection of the connection with the second wireless communication device and the connection with the third wireless communication device, and transmitting a permission request for the communication with the second wireless communication device and the communication with the third wireless communication device;
   a specific unit specifying a priority candidate device out of the second wireless communication device and the third wireless communication device; and
   a communication control unit granting a permission to the communication with the priority candidate device when receiving the permission request,
   wherein the specific unit determines whether the second wireless communication device is the priority candidate device based on a possibility that the connection with the second wireless communication device will be disconnected.

2. The first wireless communication device according to claim 1, wherein the communication control unit grants the permission to the communication with a non-priority candidate device out of the second wireless communication device and the third wireless communication device during an occupation possibility period occupied by the communication of the non-priority candidate device, which does not overlap with an occupation possibility period occupied by the communication of the priority candidate device, and the communication control unit does not grant the permission during all or part of the occupation possibility period occupied by the communication of the non-priority candidate device, which overlaps with the occupation possibility period occupied by the communication of the priority candidate device.

3. The first wireless communication device according to claim 2, wherein the specific unit uses a communication failure time, during which the communication with the second wireless communication device is not permitted continuously, as a parameter related to the possibility that the communication with the second wireless communication device will be disconnected, and determines whether the second wireless communication device is the priority candidate device.

4. The first wireless communication device according to claim 3, wherein an anchor point, which becomes a starting reference for the occupation possibility period, appears repeatedly at a connection interval, wherein a plurality of occupation possibility periods configured by the occupation possibility period based on a plurality of anchor points configured by the anchor point are included in different connection interval periods, wherein the connection interval period is a period between two adjacent anchor points, wherein each of the occupation possibility period includes at least one exchange unit period for a packet exchange in which a packet is exchanged once with a communication partner, and wherein the connection control unit disconnects the connection for which the packet exchange has not been established even once before a monitoring timer expires.

5. The first wireless communication device according to claim 4, wherein the connection control unit counts a number of connection intervals in which the communication of the second wireless communication device is continuously not permitted, wherein the specific unit includes:

a calculation unit calculating the communication failure time based on the counted number of times and a length of time of the connection interval; and a determination unit determining whether the second wireless communication device is the priority candidate device based on the communication failure time and a first threshold.

6. The first wireless communication device according to claim 5, wherein the calculation unit calculates the first threshold by multiplying an initial value of the monitoring timer by a predetermined coefficient less than 1, and wherein the determination unit determines that the second wireless communication device is the priority candidate device when the communication failure time is the first threshold or more.

7. The first wireless communication device according to claim 4, wherein when each of the occupation possibility period includes a plurality of exchange unit periods, the communication control unit grants the permission to the communication with the non-priority candidate device in the exchange unit period of the non-priority candidate device, which does not overlap with the occupation possibility period of the priority candidate device and the communication control unit does not grant the permission to the communication with the non-priority candidate device in the exchange unit period of the non-priority candidate device, which overlaps with the occupation possibility period of the priority candidate device.

8. The first wireless communication device according to claim 4, wherein when a number of consecutive connection interval periods in which the communication with the priority candidate device is not established is a second threshold or more, the communication control unit does not grant the permission to the communication with the priority candidate device for a predetermined number of connection interval periods.

9. The first wireless communication device according to claim 4, wherein the communication control unit does not grant the permission to the communication of the non-priority candidate device during the connection interval periods of all the non-priority candidate devices existing from current timing to the next connection interval period of the priority candidate device.

10. The first wireless communication device according to claim 1, wherein the communication between the first wireless communication device and the second wireless communication device and the communication between the first wireless communication device and the third wireless communication device are based on a Bluetooth Low Energy protocol.

11. A method performed by a first wireless communication device capable of establishing each of a connection with a second wireless communication device and a connection with a third wireless communication device and communicating with them, the method comprising:

performing a connection control processing of: controlling establishment and disconnection of a connection with the second wireless communication device and a connection with the third wireless communication device; and transmitting a permission request for the connection with the second wireless communication device and the connection with the third wireless communication device;

specifying a priority candidate device out of the second wireless communication device and the third wireless communication device; and performing a communication control processing of granting a permission to the communication with the priority candidate device when receiving the permission request, wherein the specifying includes determining whether the second wireless communication device is the priority candidate device based on a possibility that the connection with the second wireless communication device will be disconnected.

12. The method according to claim 11, wherein the communication control processing includes: granting the permission to a communication with a non-priority candidate device out of the second wireless communication device and the third wireless communication device during an occupation possibility period occupied by the communication of the non-priority candidate device, which does not overlap with an occupation possibility period occupied by the communication of the priority candidate device, when receiving the permission request for each of the communication with the second wireless communication device and the communication with the third wireless communication device; and not granting the permission during all or part of the occupation possibility period occupied by the communication of the non-priority candidate device, which overlaps with the occupation possibility period occupied by the communication of the priority candidate device.

13. The method according to claim 12, wherein the determining includes determining that the second communication device is the priority candidate device by the second wireless communication device by using a communication failure time, during which the communication of the second wireless communication device is not permitted continuously, as a parameter related to the possibility that the communication with the second wireless communication device will be disconnected.

14. The method according to claim 13, wherein an anchor point, which is a starting reference for the occupation possibility period, appears repeatedly at an interval of the connection, wherein a plurality of occupation possibility periods based on a plurality of anchor points are included in different connection interval periods, the plurality of occupation possibility periods being configured by the occupation possibility period, the plurality of anchor points being configured by the anchor point, wherein the connection interval period is a period between two adjacent anchor points, wherein each of the occupation possibility periods includes at least one exchange unit period for performing a packet exchange in which a packet is exchanged once with a communication partner, and wherein the connection control processing includes disconnecting the connection for which the packet exchange is not established even once before a monitoring timer expires.

15. The method according to claim 14, wherein the method includes counting a number of connection intervals in which the communication of the second wireless communication device is not permitted consecutively, wherein the determining includes:

calculating the communication failure time based on the counted number of times and a length of time of the connection interval;

determining whether the second wireless communication device is the priority candidate device based on the communication failure time and a first threshold.

16. The method according to claim 15, wherein the calculating includes calculating the first threshold by multiplying an initial value of the monitoring timer by a predetermined coefficient less than 1, and wherein the determining includes determining that the second wireless communication device is the priority candidate device when the communication failure time is the first threshold or more.

17. The method according to claim 14, wherein the communication control processing includes: granting a permission to the communication with the non-priority candidate device in the exchange unit period of the non-priority candidate device, which does not overlap with the occupation possibility period of the priority candidate device, when each of the occupation possibility period includes a plurality of exchange unit periods configured by the exchange unit period; and not granting the permission to the communication with the non-priority candidate device in the exchange unit period of the non-priority candidate device, which overlaps with the occupation possibility period of the priority candidate device.

18. The method according to claim 14, wherein the communication control processing includes not granting the permission to the communication with the priority candidate device for a predetermined number of connection interval periods when a number of consecutive connection interval periods in which the communication with the priority candidate device is not established is a second threshold or more.

19. The method according to claim 14, wherein the communication control processing includes not granting the permission to the communication of the non-priority candidate device in all the connection interval periods of the non-priority candidate devices, which exist from current timing to the next connection interval period of the priority candidate device.

20. The method according to claim 11, wherein the communication between the first wireless communication device and the second wireless communication device and the communication between the first wireless communication device and the third wireless communication device are based on a Bluetooth Low Energy protocol.

* * * * *